US011213933B2

(12) United States Patent
Kato et al.

(10) Patent No.: US 11,213,933 B2
(45) Date of Patent: Jan. 4, 2022

(54) ELECTRIC WORKING MACHINE

(71) Applicant: MAKITA CORPORATION, Anjo (JP)

(72) Inventors: Itsuku Kato, Anjo (JP); Akira Tomonaga, Anjo (JP); Katsuna Hayashi, Anjo (JP); Tokuo Hirabayashi, Anjo (JP); Tomoyuki Kondo, Anjo (JP)

(73) Assignee: MAKITA CORPORATION, Anjo (JP)

( * ) Notice: Subject to any disclaimer, the term of this patent is extended or adjusted under 35 U.S.C. 154(b) by 349 days.

(21) Appl. No.: 16/157,475

(22) Filed: Oct. 11, 2018

(65) Prior Publication Data
US 2019/0111550 A1 Apr. 18, 2019

(30) Foreign Application Priority Data

Oct. 17, 2017 (JP) .............................. JP2017-201058

(51) Int. Cl.
| | |
|---|---|
| *B25B 21/02* | (2006.01) |
| *B25D 11/04* | (2006.01) |
| *H02P 29/20* | (2016.01) |
| *H02P 29/40* | (2016.01) |
| *B25B 23/147* | (2006.01) |
| *B25F 5/00* | (2006.01) |

(52) U.S. Cl.
CPC .......... *B25B 21/02* (2013.01); *B25B 23/1475* (2013.01); *B25D 11/04* (2013.01); *B25F 5/00* (2013.01); *H02P 29/20* (2016.02); *H02P 29/40* (2016.02); *B25D 2250/005* (2013.01); *B25D 2250/095* (2013.01); *B25D 2250/201* (2013.01); *B25D 2250/221* (2013.01); *B25D 2250/265* (2013.01)

(58) Field of Classification Search
CPC ..... B25B 21/02; B25B 23/1475; B25D 11/04; B25F 5/00
USPC ............................................................ 173/2
See application file for complete search history.

(56) References Cited

U.S. PATENT DOCUMENTS 5,105,130 A 4/1992 Barker et al.
9,296,095 B2 * 3/2016 Yoshino .................. B25B 21/00
(Continued)

FOREIGN PATENT DOCUMENTS

EP 1207016 A2 5/2002
EP 1510299 A2 3/2005
(Continued)

OTHER PUBLICATIONS

Mar. 22, 2019 Extended Search Report issued in European Patent Application No. 18200753.4.
(Continued)

*Primary Examiner* — Michelle Lopez
(74) *Attorney, Agent, or Firm* — Oliff PLC

(57) ABSTRACT

An electric working machine in one aspect of the present disclosure includes: a motor; a controller for controlling driving of the motor; a first setter; and a second setter. The first setter is operated for setting, as a control method for the motor, which is usable by the controller, one of control methods preliminarily registered. The second setter is operated for setting, as a control method for the motor, which is usable by the controller, at least one of the control methods settable via the first setter.

9 Claims, 14 Drawing Sheets

(56) References Cited

U.S. PATENT DOCUMENTS

| | | | |
|---|---|---|---|
| 9,908,182 B2* | 3/2018 | Phillips | G05B 19/4083 |
| 10,646,982 B2* | 5/2020 | Dey, IV | B25B 23/1475 |
| 2005/0045354 A1 | 3/2005 | Arimura et al. | |
| 2011/0127941 A1 | 6/2011 | Hirabayashi et al. | |
| 2013/0023860 A1 | 1/2013 | Nagashimada | |
| 2013/0105187 A1 | 5/2013 | Agehara et al. | |
| 2016/0354888 A1* | 12/2016 | Huber | F16D 48/06 |

FOREIGN PATENT DOCUMENTS

| | | |
|---|---|---|
| EP | 2474391 A1 | 7/2012 |
| EP | 2589465 A2 | 5/2013 |
| JP | 2002-160180 A | 6/2002 |
| JP | 2005-066785 A | 3/2005 |
| JP | 2011-110668 A | 6/2011 |
| JP | 2012-240165 A | 12/2012 |
| JP | 2013-094912 A | 5/2013 |
| JP | 2014-148001 A | 8/2014 |
| JP | 2014-233793 A | 12/2014 |
| JP | 2017-104969 A | 6/2017 |
| WO | 2011-122516 A1 | 10/2011 |

OTHER PUBLICATIONS

Jan. 15, 2021 Office Action issued in Chinese Patent Application No. 201810938658.5.
Nov. 27, 2020 Office Action issued in European Patent Application No. 18200753.4.
Apr. 6, 2021 Office Action issued in Japanese Patent Application No. 2017-201058.
Jun. 28, 2021 Office Action issued in Chinese Patent Application No. 201810938658.5.

* cited by examiner

PWM DUTY TABLE

| TRIGGER PULLING AMOUNT | PWM DUTY | | | | |
|---|---|---|---|---|---|
| | LOW | MEDIUM | HIGH | MAXIMUM | BOLT |
| 0 | 0% | 0% | 0% | 0% | 0% |
| 1 | 10% | 10% | 10% | 10% | 10% |
| 2 | 13% | 15% | 18% | 20% | 40% |
| 3 | 16% | 20% | 26% | 30% | 70% |
| 4 | 19% | 25% | 34% | 40% | 100% |
| 5 | 22% | 30% | 42% | 50% | 100% |
| 6 | 25% | 35% | 50% | 60% | 100% |
| 7 | 28% | 40% | 58% | 70% | 100% |
| 8 | 31% | 45% | 66% | 80% | 100% |
| 9 | 34% | 50% | 74% | 90% | 100% |
| 10 | 37% | 55% | 82% | 100% | 100% |

ELECTRIC WORKING MACHINE

CROSS-REFERENCE TO RELATED APPLICATIONS

This application claims the benefit of Japanese Patent Application No. 2017-201058 filed on Oct. 17, 2017 with the Japan Patent Office, the entire disclosure of which is incorporated herein by reference.

BACKGROUND

The present disclosure relates to an electric working machine whose motor control methods are changeable by an external operation.

An electric power tool disclosed in Japanese Unexamined Patent Application Publication No. 2017-104969 is configured such that motor control methods (such as a rotational speed, a change pattern of the rotational speed, and so on) are changeable according to contents of a work.

In such an electric power tool, if providing a switch to select for each of the control methods settable therewith, an operation portion as a whole has to be large. Therefore, in a case of a compact electric power tool that can be operated in hand, since downsizing of its operation portion as a whole is required, the tool is configured such that a desired control method can be selected from the control methods with one switch.

SUMMARY

However, when selecting the desired control method (mode) out of a large set of modes with the one switch, multiple manipulations of the switch are required. Accordingly, this leads to a problem of poor operability when selecting the desired mode.

For example, if five modes (e.g., "Maximum", "High", "Medium", "Low", and "Tex") are defined as the mode of a motor, then in order to change the mode by operating the one switch, it is necessary to change the mode in an order preliminarily set. Note, "Tex" is a registered trademark, but is also used as a term of art referring to all screws with a drill portion at their tips. The term "Tex" is used as a term of art in this specification and claims.

If such a changing order of the modes is sequential, for example, Maximum→High→Medium→Low→Tex, then it is necessary to operate the switch for four times when changing from Maximum to Tex. Accordingly, it takes substantial time and effort to operate the switch and set the mode in a sequential order. Sequential order is an inefficient search algorithm, particularly for large numbers of items.

The sequential order may "loop back" (or "reset") to "Maximum" after "Tex", or alternatively may "reverse direction" to "Low" after "Tex". In other words, there are at least two types of sequential orders: loop back; or reverse direction upon reaching the end of a list.

In one aspect of the present disclosure, it is desirable to allow the control method to be changed more easily even with an electric working machine whose changeable control methods are numerous.

An electric working machine in one aspect of the present disclosure includes: a motor; a controller for controlling driving of the motor; a first setter; and a second setter.

The first setter is operated for setting, as a control method for the motor, which is usable by the controller, one of control methods (or control modes or control characteristics) preliminarily registered. The second setter is operated for setting, as a control method for the motor, which is usable by the controller, at least one of the control methods settable via the first setter. In one embodiment, the second setter may toggle between just two of the methods that are also available through the first setter.

Thus, a user can set the control method used for controlling the motor by operating the first setter and/or the second setter. This enables the user to set the control method easily compared to a case where the control method is changed sequentially and set by operating the first setter only.

For example, by limiting the control methods settable via the second setter to a small portion of the available control methods, the user can easily set a desired control method by operating the second setter. This improves operability of the electric working machine when setting the control method.

Then, the controller may be configured to be able to register the control methods settable via the second setter, in response to a specified operation made to the electric working machine.

In such a manner, the user can select some control method(s) from the control methods settable via the first setter, and register the selected control method(s) for use by the second setter. This enables the user to select a desired control method more easily by operating the second setter. In one embodiment, for example, the second setter may toggle between "High" and "Tex". Or the second setter may be modified (by registering other modes) to toggle between "Maximum" and "Low", according to a user's preference.

In this case, then, the controller may be configured to be able to register, as the control method settable via the second setter, control methods that are selected from the control methods settable via the first setter.

In the above-described case where the control methods can be registered as the control method settable via the second setter, then, the controller may be configured to, in response to an operation of the second setter, select, as a use control method used for controlling the motor, one of such registered control methods.

In such a manner, the user can register the control methods frequently used for a certain job via the second setter. This registration enables the user to easily select one or more of such registered control methods by operating the second setter.

Accordingly, the user can perform an action setting of the electric working machine more easily, which improves usability of the electric working machine.

The controller may be configured to memorize the control methods, each of which being set via both the first setter and the second setter, and to, in response to an operation of the second setter, select one of the memorized control methods as the use control method used for controlling the motor.

In such a manner, when the control method set via both the first setter and the second setter is memorized, the user can select one of the set and memorized control methods as the use control method used for controlling the motor by operating the second setter only.

Then, the electric working machine may include a first notifier configured to notify information regarding the electric working machine. And then, the controller may be configured to, when the use control method used for controlling the motor is the control method set via the second setter, notify accordingly via the first notifier. In such a manner, the user can confirm via which setter, the first setter or the second setter, the control method for the motor, which is currently in use for the control, is set. Further, the user can know which one, the first setter or the second setter, to operate for changing the use control method next time based on the notification by the first notifier.

Then, the controller may be configured to, in response to an operation of the second setter, be able to set, as the control method, all of the control methods settable in response to an operation of the first setter. In such a manner, by using the first setter, the second setter, or both, the user can select and set the control method usable for the motor from all of the control methods that are executable by the controller.

Accordingly, depending on a use situation of the electric working machine, the user can select, out of the first setter and the second setter, the setter(s) that can be operated more easily. For example, this may also allow the user to operate the first setter and the second setter alternately by using a right hand and a left hand respectively, thereby enabling setting of a desired control method in a short period of time.

Then, the first setter may include third setters configured to be operated for setting the control methods which are different from each other. In this case, then, the controller may be configured to, in response to an operation of the second setter, be able to set all of the control methods settable with one of the third setters.

This enables setting of all of the control methods settable with one of the third setters that the first setter includes by operating the second setter, which can bring about the same effects as above.

Then, the controller may be configured to, in response to a specified registering operation made to the electric working machine, register the currently set control method as the control method settable via the second setter.

In such a manner, when frequently using the currently set control method, for example, the user can register such a control method as the control method settable by the second setter. After the registration, the user can set such a registered control method via the second setter easily, which improves usability of the electric working machine.

Then, the electric working machine may include a manipulator configured to be manipulated for allowing function of the electric working machine to work. And then, the registering operation may be a combination of operations of two or more of the first setter, the second setter, and the manipulator.

In this case, in order to register the currently set control method as the control method settable by the second setter, the user is required to perform the combination of operations of two or more of the setters and the manipulator. Accordingly, this can inhibit the control method from being wrongly registered when either one of the setters or the manipulator is wrongly operated.

Then, the controller may be configured to, in response to a specified releasing operation made to the electric working machine, release registration of the control methods settable via the second setter.

In other words, when the control method(s) can be arbitrarily registered as the control method settable via the second setter, the registration of such a control method(s) can be released by the specified releasing operation.

This enables the registration of the control methods settable via the second setter to be changed any time. Accordingly, when the user changed contents of a work for which the electric working machine is used, the user can re-register the control method suitable to the changed contents of the work as the control method settable via the second setter, which can improve usability of the electric working machine.

In this case, then, the controller may include a manipulator to be operated for allowing the functions of the electric working machine to work. The releasing operation, then, may be the combination of operations of two or more of the first setter, the second setter, and the manipulator. Such a configuration can inhibit the registration of the control method settable via the second setter from being wrongly released when either one of the setters or the manipulator is wrongly operated.

In a case where the controller is configured to be able to arbitrarily register the control method(s) as the control method settable via the second setter, then, the controller may include a non-volatile memory as a memory device where such a control method(s) is registered, the non-volatile memory being able to maintain memory contents even though electrical power supply to the electric working machine is blocked.

In such a manner, since the control method(s) registered as the control method settable via the second setter is memorized in the non-volatile memory, deletion of such a control method(s) due to blocking of electrical power supply, or the like can be inhibited.

Then, the controller may be configured to, in response to a specified prohibiting operation made to the electric working machine, prohibit setting of the control method via the second setter. In such a manner, the setting of the control method via the second setter can be performed only when such a setting is permitted. This can inhibit the control method from being wrongly changed by wrongly operating the second setter, or the like.

In this case, then, the electric working machine may include a manipulator configured to be manipulated for allowing function of the electric working machine to work. And then, the prohibiting operation may be a combination of operations of two or more of the first setter, the second setter, and the manipulator. Such a configuration can inhibit the setting of the control method via the second setter from being wrongly prohibited when either one of the setters or the manipulator is wrongly operated.

Then, in the controller, the control methods whose rotational speed command values are different from each other may be registered as the control method settable via the first setter. And then, in the controller, the control methods that change a rotational speed to be commanded in response to a load applied to the motor may be registered as the control method settable via the first setter.

Then, the electric working machine may include a grip that the user grips. In this case, then, the second setter may be provided at a position so as to be operable by a hand of the user, the hand gripping the grip.

In such a manner, the user can operate the second setter while gripping the grip of the electric working machine for performing a desired work. This enables the user to change the control method for the motor via the second setter during the work where the electric working machine is used, which improves usability of the electric working machine.

Then, in the grip, a driving manipulator may be provided, the driving manipulator being configured to be manipulated for commanding driving or stopping of the motor. In this case, then, the second setter may be provided on an upper side of the driving manipulator in a state where the user grips the grip. That is, in such a manner, for operating the second setter, the user is required to move a finger thereof higher than for operating the driving manipulator. This can inhibit the user from wrongly operating the second setter together when operating the driving manipulator. In other words, a wrong operation of the second setter can be inhibited.

Then, the electric working machine may include a second notifier configured to notify information regarding the electric working machine. And then, the controller may be configured to, in response to receiving of an action command including the control method used for controlling the motor from the second setter, notify accordingly via the second notifier.

In such a manner, for example, when the user has changed the control method used for controlling the motor by operating the second setter during the work where the electric working machine is used, the user can confirm whether such an operation has been correctly conducted based on the notification by the second notifier.

In this case, then, the second notifier may include a light having a function of lighting an area ahead of the electric working machine. With such a configuration, the light can be used as the second notifier and according to absence or presence of lighting by the light, the user can confirm whether the change of the use control method via the second setter has been conducted.

BRIEF DESCRIPTION OF THE DRAWINGS

Example embodiments of the present disclosure will be described below with reference to the accompanying drawings, in which.

DETAILED DESCRIPTION OF THE PREFERRED EMBODIMENTS

One embodiment is a rechargeable impact driver 1. Tex is a registered trademark. However, "Tex" in the following description and claims is used broadly to refer to screws with a built-in drill at the tip, and not as a trademark or a brand. This is a term of art in the industry.

<1. Configuration>

Figure 1:
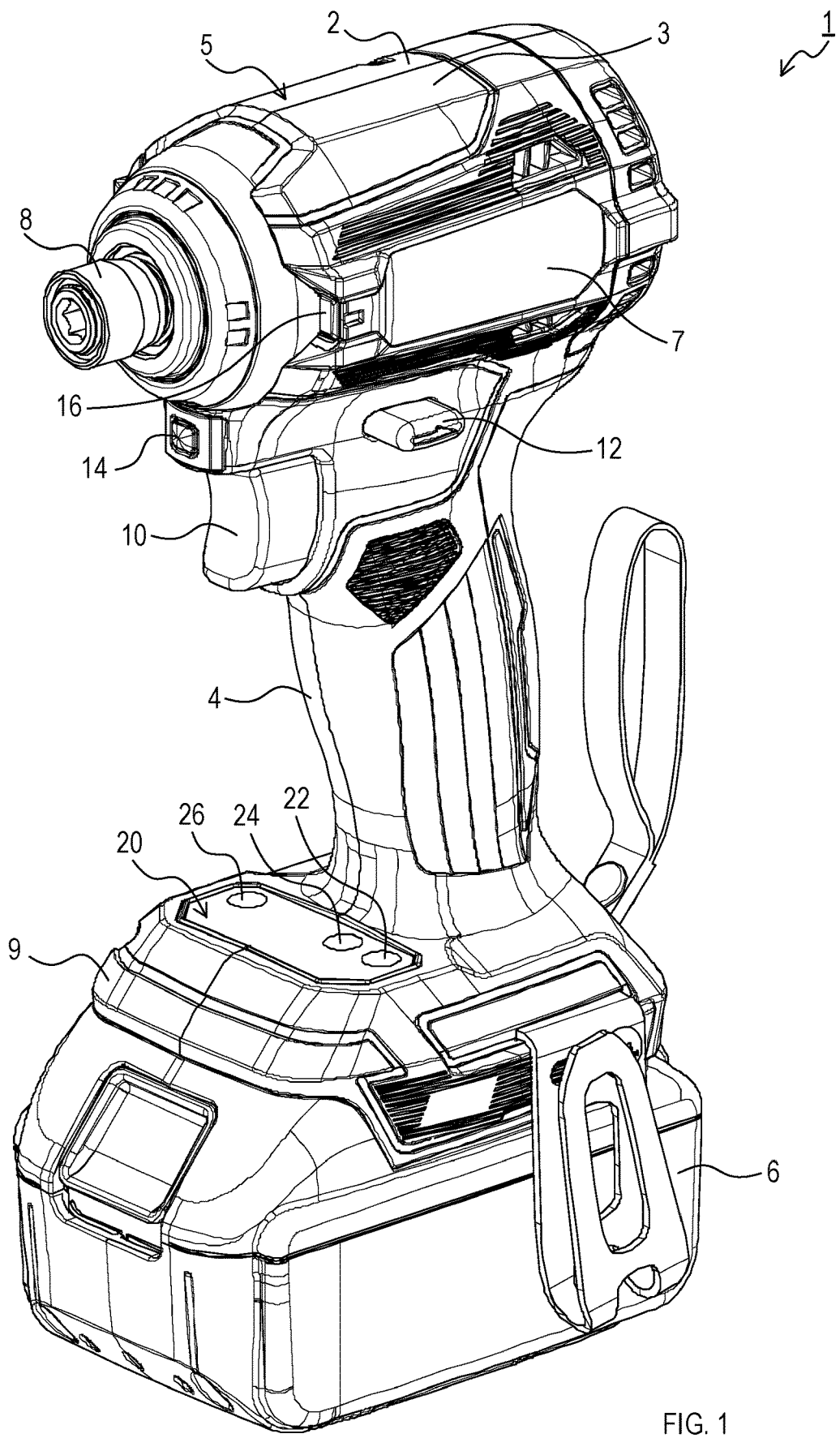
FIG. 1 is a perspective view showing a configuration of a rechargeable impact driver as a whole according to an embodiment.

In FIG. 1, the rechargeable impact driver 1 (hereinafter referred to as a driver 1) is an electric power tool. The driver 1 includes a main body housing 5. The main body housing 5 is configured through assembling right-half and left-half housings 2 and 3 together, and in a lower section thereof, a grip 4 is provided. In the main body housing 5, provided at a lower end of the grip 4 is a battery mounting portion 9 for mounting a battery pack 6 in an attachable-and-detachable manner.

The main body housing 5 includes a motor storage portion 7 in a left side of the driver 1. The motor storage portion 7 stores a motor 30 (shown in FIG. 2) that powers the driver 1. In the main body housing 5, stored in front of the motor storage portion 7 are a deceleration mechanism (not shown) and a hammering mechanism (not shown).

At a leading end of the main body housing 5, provided is a chuck sleeve 8 for mounting various tool bits (not shown) such as a driver bit and a socket bit to an output shaft that is driven by the motor 30.

The hammering mechanism, for example, is equipped with a spindle, a hammer, and an anvil. The spindle is rotated through the deceleration mechanism. The hammer rotates together with the spindle and is movable in an axis direction. Provided in front of the hammer is the anvil and at a leading edge thereof, the tool bit is to be mounted.

Specifically, in the hammering mechanism, when the spindle rotates along with rotation of the motor 30, the anvil rotates through the hammer, and thus, the chuck sleeve 8 (holding the tool bit) rotates.

Then, when screw-tightening by the tool bit progresses and a load to the anvil is heightened, the hammer recedes in resisting to a biasing force of a coil spring and comes off from the anvil. The hammer after coming off from the anvil rotates together with the spindle and proceeds forward by the biasing force of the coil spring so as to engage with the anvil again.

As a result, a hammering force is intermittently applied to the anvil and additional screw-tightening is performed by the tool bit. Since such a hammering mechanism has been known conventionally, a detailed explanation thereon is omitted herein.

The grip 4 is a gripping portion to be gripped when a user uses the driver 1, and at an upper leading end of the grip 4, a trigger 10 is provided. The trigger 10 is a portion to be pulled by a finger of the user who is gripping the grip 4.

Figure 2:
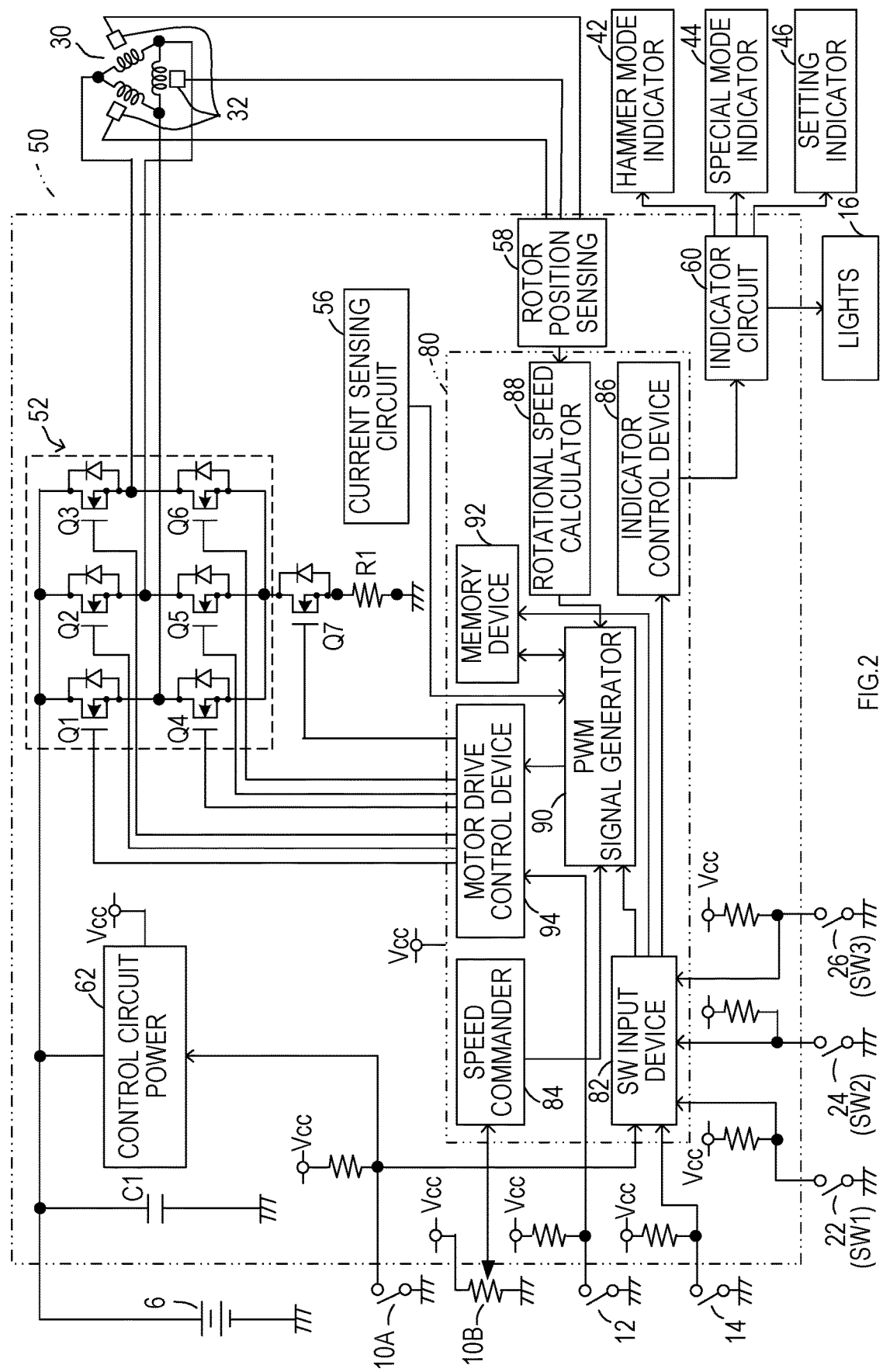
FIG. 2 is a block diagram showing an electrical configuration of a motor drive device.

Provided in the trigger 10 are a main switch 10A (see FIG. 2) and a manipulating amount sensor 10B (see FIG. 2). While the trigger 10 is being pulled, the main switch 10A is in an ON state The manipulating amount sensor 10B includes a variable resistor where a resistance value changes according to a pulling amount of the trigger 10, and senses the pulling amount of the trigger 10 (in other words, a manipulating amount).

Further, on an upper side of the trigger 10 (on an upper end side of the grip 4) is a mode-change switch 14 as one example of a second setter of the present disclosure. The mode-change switch 14 is a switch for changing a mode of the driver 1 to a desired mode according to a manipulation made in the switch, and may act as a toggle switch, toggling between two modes.

In the grip 4, provided on a rear side of the mode-change switch 14 is a forward/reverse changeover switch 12. The forward/reverse changeover switch 12 is a switch for switching a rotational direction of the motor 30 between a forward direction that is a screw-tightening direction, and a reverse direction.

In the main body housing 5, provided as lighting portions for lighting an area ahead are a pair of right and left lights 16 (only the left side is shown) with the chuck sleeve 8 therebetween. The lights 16 includes LEDs. The lights 16 light up their LEDs when a signal following the manipulation made in the mode-change switch 14 is input to a control circuit 80 (see FIG. 2) so as to notify the user that the mode-change switch 14 is manipulated. That is, the lights 16 also serve as one example of a second notifier (as a notifier for the second setter).

Further in the main body housing 5, an operation panel 20 is provided in the battery mounting portion 9 disposed downward of the grip 4.

In the operation panel 20, provided as one example of a first setter of the present disclosure are a hammering switch 22 and a special switch 26, which are switches for selectively setting the mode of the driver 1 out of preliminarily set eight types of the mode (four hammer modes and four special modes). Also in the operation panel 20, provided is a light switch 24 used for lighting up or turning off the LEDs of the lights 16.

Figure 3:
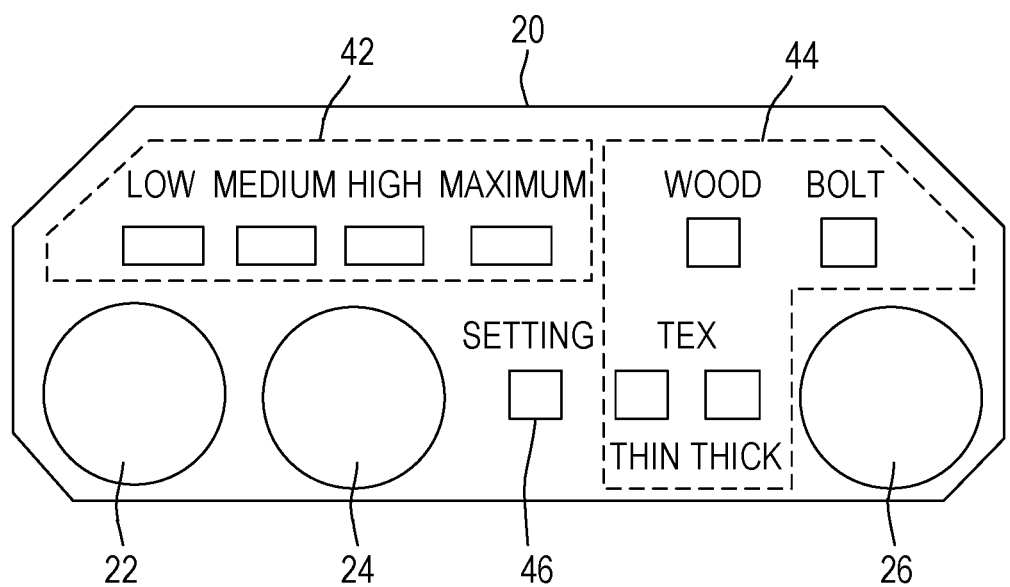
FIG. 3 is a plan view showing a layout of switches and indicators in an operation panel.

As shown in FIG. 3, also provided in the operation panel 20 as indicators for showing a setting status of the mode are: hammer mode indicators 42; special mode indicators 44; and a setting indicator 46.

The hammer mode indicators 42 display (or indicate, or light up) the single hammer mode set (selected) with the hammering switch 22. Provided in the hammer mode indicators 42 are four indicators for displaying the four types of the hammer mode, which are selectable sequentially by a manipulation of the hammering switch 22.

The special mode indicators 44 display the special mode set with the special switch 26. Provided in the special mode indicators 44 are four indicators for showing the four types of the special mode, which are selectable sequentially by a manipulation of the special switch 26.

The setting indicator 46 includes an LED and lights up the LED when the current mode displayed in the hammer mode indicator 42 or the special mode indicator 44 is the mode set with the mode-change switch 14. That is, the setting indicator 46 lights up the LED so as to notify that the current mode has been set with the mode-change switch 14. The setting indicator 46 serves as one example of a first notifier of the present disclosure. The hammer mode indicators 42, the special mode indicators 44, and the setting indicator 46 may include light sources other than LEDs, or may include a part of a touch screen LCD (liquid crystal display), or any other type of display.

The eight "operation" modes, which are set with the hammering switch 22 and the special switch 26, will be described specifically later. See FIG. 3.

A battery stored in the battery pack 6 in the present embodiment is, for example, a repeatedly rechargeable battery such as a lithium ion battery.

As shown in FIG. 2, the motor 30 in the present embodiment is configured with a three-phase brushless motor including armature windings of respective phases, U-phase, V-phase, and W-phase. Further, the motor 30 is equipped with a rotation sensor 32 for sensing a rotational position (angle) of the motor 30.

The rotation sensor 32 includes, for example, a Hall IC configured with three Hall elements disposed correspondingly to the respective phases of the motor 30. The rotation sensor 32 generates a rotation sensing signal per specified rotational angle of the motor 30.

Also provided inside the grip 4 is a motor drive device 50 that receives electric power supply from the battery pack 6 and controls driving of the motor 30.

As shown in FIG. 2, provided in such a motor drive device 50 are a drive circuit 52, a current sensing circuit 56, a rotor position sensing circuit 58, an indicator circuit 60, a control circuit power supply circuit 62, and a control circuit 80.

The drive circuit 52 is a circuit that receives power supply from the battery pack 6 and flows the current to the windings of the respective phases of the motor 30. In the present embodiment, the drive circuit 52 is configured as a three-phase full bridge circuit including six switching devices Q1 to Q6. Each of the switching devices Q1 to Q6 in the present embodiment is a metal-oxide-semiconductor field-effect transistor (MOSFET).

The three switching devices Q1 to Q3 in the drive circuit 52 are provided between respective terminals U, V, and W of the motor 30 and a power line connected to a positive side of the battery pack 6 as so-called high-side switches.

Further, the other three switching devices Q4 to Q6 are provided between the respective terminals U, V, and W of the motor 30 and a ground line connected to a negative side of the battery pack 6 as so-called low-side switches.

Provided on a power supply path from the positive side of the battery pack 6 to the drive circuit 52 is a capacitor C1 for reducing fluctuation in the battery voltage.

Also provided on a power supply path from the drive circuit 52 to the negative side of the battery pack 6 are a switching device Q7 for continuing or discontinuing a current flow thereon and a resistor R1 ("shunt resistor") for sensing the current. The current sensing circuit 56 outputs a voltage between both ends of the resistor R1 as a current sensing signal to the control circuit 80.

The rotor position sensing circuit 58 is a circuit for sensing the rotational position of the motor 30 based on the sensing signal from the rotation sensor 32. The rotor position sensing circuit 58 outputs a sensing signal of the rotational position to the control circuit 80.

The indicator circuit 60 is a circuit for lighting up (according to a command from the control circuit 80) one or more of: the hammer mode indicators 42; the special mode indicators 44; the setting indicator 46 in the operation panel 20; and the lights 16.

The control circuit power supply circuit 62 is a circuit for supplying power to respective portions inside the motor drive device 50. The control circuit power supply circuit 62 receives electric power supply from the battery pack 6 and generate a specified power supply voltage (constant voltage) Vcc. The generated power supply voltage Vcc is supplied to the control circuit 80, the indicator circuit 60, pull-up resistors disposed on input paths from the aforementioned various switches, and the like.

The control circuit power supply circuit 62 starts up when the main switch 10A is turned on, and stops (automatically) when a certain period of time or more has passed with no operation made in the main switch 10A, the mode-change switch 14, the hammering switch 22, and the special switch 26.

The control circuit 80 includes microcomputers including a CPU, a ROM, a RAM, and the like and includes a memory device 92. The memory device 92 includes a non-volatile memory (defined as a non-transitory storage medium) where data is rewritable, and control characteristics of the motor 30 for the aforementioned respective modes and the like are stored in the memory device 92.

The control circuit 80 may include, instead of or in addition to the microcomputers, a combination of various separate electronic components, an Application Specified Integrated Circuit (ASIC), an Application Specific Standard Product (ASSP), a programmable logic device such as a Field Programmable Gate Array (FPGA), or a combination thereof.

Connected to the control circuit 80 are: the main switch 10A; the manipulating amount sensor 10B; the forward/reverse changeover switch 12; the mode-change switch 14; the hammering switch 22; the light switch 24; and the special switch 26.

According to a program performed by the CPU, the control circuit 80 serves as a SW input device 82, a speed commander 84, an indicator control device 86, a rotational speed calculator 88, a pulse width modulation (PWM) signal generator 90, and a motor drive control device 94.

The SW input device 82 detects an ON state or an OFF state of the main switch 10A, the mode-change switch 14, the hammering switch 22, the light switch 24, and the special switch 26, and then performs setting of the aforementioned modes as well as setting of a light-ON state or a light-OFF state of various LEDs in the various indicators (42, 44, and 46) and in the lights 16.

The mode set in the SW input device 82 is stored in the memory device 92 and used by the PWM signal generator 90 for generating a PWM signal. Also, the light-ON state or the light-OFF state of the various LEDs is output to the indicator control device 86. According to such output from the SW input device 82, the indicator control device 86 lights up or turns off the various LEDs via the indicator circuit 60.

The speed commander 84 senses the manipulating amount of the trigger 10 based on an input signal from the manipulating amount sensor 10B, and outputs the sensed manipulating amount to the PWM signal generator 90 as a speed command during the driving of the motor.

The rotational speed calculator 88 calculates a duty percentage or a duty ration (associated with a no-load rotational speed of the motor 30) based on the sensing signal from the rotor position sensing circuit 58, and outputs calculation results to the PWM signal generator 90.

The PWM signal generator 90, then, reads out from the memory device 92 the control characteristics corresponding to the mode set in the SW input device 82 and according to the control characteristics, generates the PWM signal that is a control signal for driving the motor 30. For example, see the PWM Duty Table in FIG. 4B.

Specifically, the PWM signal generator 90 generates the PWM signal based on the control characteristics read out from the memory device 92, the speed command (in other words, the manipulating amount of the trigger 10) input from the speed commander 84, and the rotational speed of the motor 30, which is input from the rotational speed calculator 88.

Further, based on the sensing signal from the current sensing circuit 56, the PWM signal generator 90 monitors a current flowing in the motor 30. When an excessive current flows in the motor 30, the PWM signal generator 90 commands the motor drive control device 94 to stop the motor 30 or reduce the rotational speed of the motor 30.

Then, according to the PWM signal generated by the PWM signal generator 90, the motor drive control device 94 allows a current to flow to the windings of the respective phases of the motor 30 so as to rotate the motor 30 by turning on or off the respective switching devices Q1 to Q6, which are included in the drive circuit 52.

Further, the motor drive control device 94, based on an input signal input thereto from the forward/reverse changeover switch 12, changes the rotational direction of the motor 30.

<2. Modes>

The modes set with the hammering switch 22 and the special switch 26 will be described next.

As shown in FIG. 3, at the driver 1 of the present embodiment, the four types of the hammer mode ("Maximum", "High", "Medium", and "Low"), and the four types of the special mode ("Wood", "Bolt", "Tex (thin)", and "Tex (thick)") total eight possible modes.

The modes specify control methods of the motor 30, and in order to realize the control methods, the control characteristics required for controlling the motor 30 in each mode are preliminarily stored (memorized or registered) in the memory device 92.

The four types of the hammer mode (Maximum, High, Medium, and Low) are changeable in an order of Maximum→High→Medium→Low→Maximum . . . through operating the hammering switch 22. The reverse order (from lowest to highest, and then repeating) is also possible. As previously mentioned this sequential order may loop back, or may reverse order when reaching the last type.

The four types of the special mode (Wood, Bolt, Tex (thin), and Tex (thick)) are similarly changeable through operating the special switch 26 in an order of Wood→Bolt→Tex (thin)→Tex (thick)→Wood . . . .

Figures 4A, 4B:
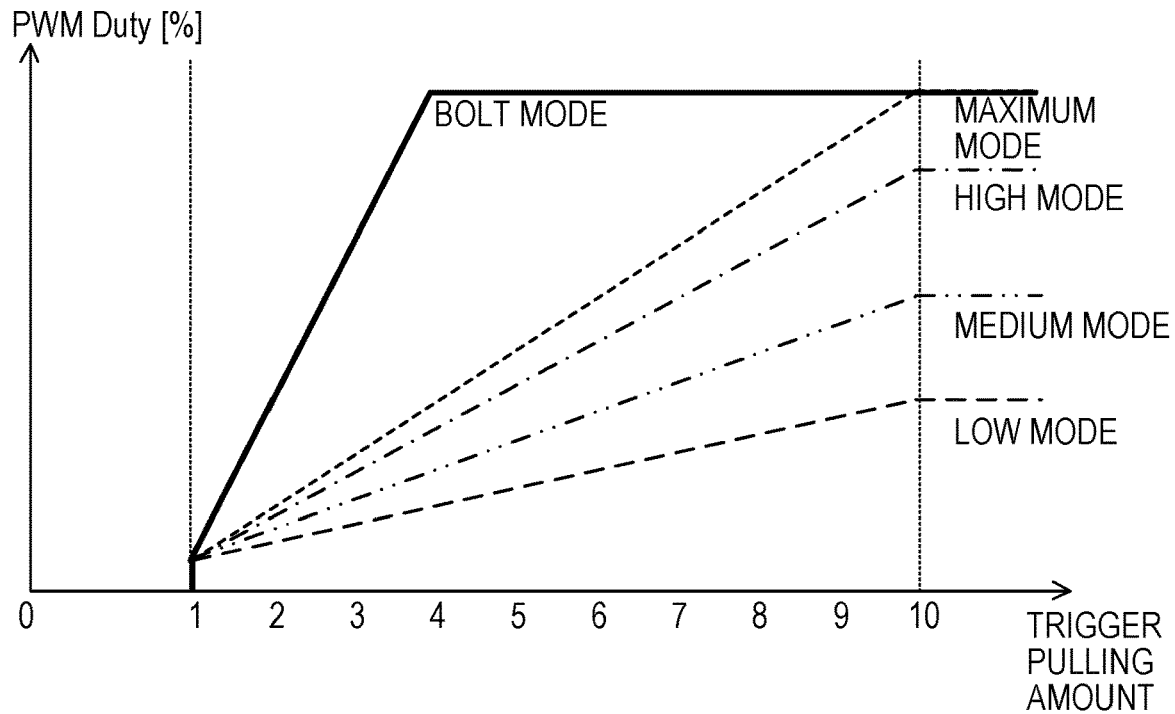
FIG. 4A is a graph showing control characteristics used for rotation control of the motor in a controller.
FIG. 4B is a mapping table of characteristic control used for the rotation control of the motor.

As exemplified in FIGS. 4A and 4B, the hammer modes are also known as typical modes for screw-tightening. And for each of the four hammer modes, set are the control characteristics for setting a duty ratio of the control signal (the PWM signal) during the driving of the motor 30 in proportion to the pulling amount (manipulating amount) of the trigger 10. The control characteristics exhibit a corresponding relationship between the pulling amount of the trigger 10 and the duty ratio.

Specifically, the control characteristics for Maximum of the hammer mode are set to bring the duty ratio of the PWM signal to its maximum (100%) when the pulling amount of the trigger is largest, for example, 10 on a scale of the trigger pulling amount from 1 to 10 (or from 10% to 100% of the maximum trigger pulling). When the duty ratio is the maximum (100% in the Maximum mode), the motor 30 rotates at the maximum speed (in a no-load condition).

The control characteristics for Maximum, High, Medium, and Low of the hammer mode are set so that in sequence thereof, the duty ratio of the PWM signal is respectively less (see FIG. 4A) when the pulling amount of the trigger is the largest amount of 10. Accordingly, in High, Medium, or Low of the hammer mode, when the user pulls the trigger 10 by the largest amount, the maximum rotational speed of the motor 30 is smaller compared to that in Maximum of the hammer mode.

For any one of Maximum, High, Medium, and Low of the hammer mode, the control characteristics are set to bring the duty ratio of the PWM signal to the minimum value near 0 when the trigger pulling amount changes from 0 to 1 (the smallest non-zero pulling amount). And the control characteristics are set to increase the duty ratio incrementally along an increase in the trigger pulling amount from that when the trigger pulling amount is 1 (a first or triggering value) up to that when the trigger pulling amount reaches 10 (a maximum value).

Accordingly, in the hammer modes, a manipulating range where the trigger pulling amount is 1 or more is an effective manipulating range where the motor 30 is drivable. And in the hammer modes, within such an effective manipulating range, a domain of the trigger pulling amount from 1 to 10 is a controllable range where the PWM duty (associated with a no-load rotational speed) of the motor 30 is adjustable.

Figure 5:
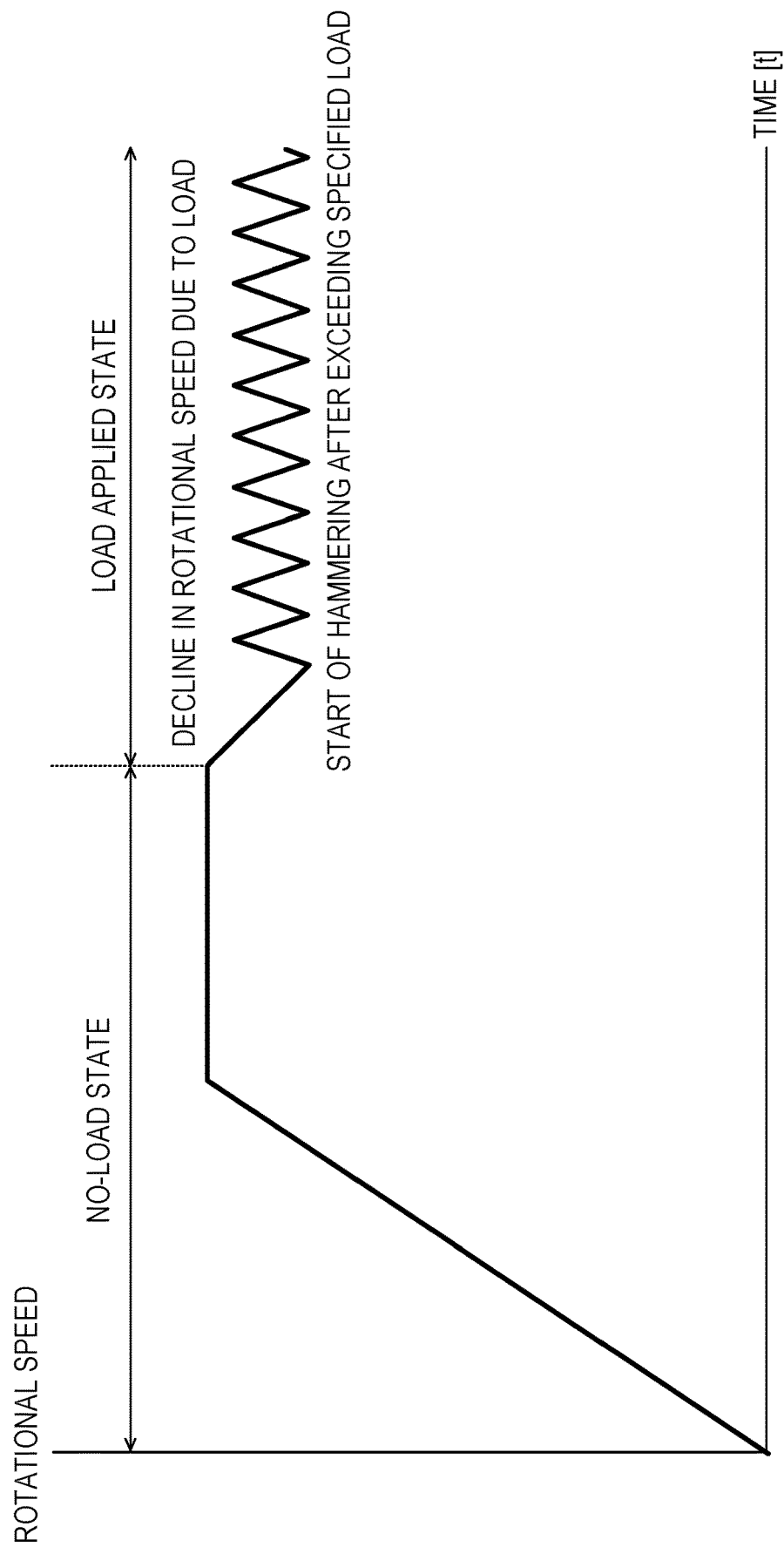
FIG. 5 is a time chart showing change in a rotational speed when the motor is controlled by using the control characteristics for normal times shown in FIG. 4B.

As a result, in the hammer modes, when the trigger 10 is pulled (manipulated), the rotational speed of the motor 30 gradually increases by a so-called soft start control as shown in FIG. 5 and if the motor 30 is in a no-load state, the rotational speed of the motor 30 becomes a constant rotational speed that corresponds to the pulling amount of the trigger 10.

When screw-tightening is performed and a load is applied to the motor 30, the rotational speed of the motor 30 decreases in response to such a load (see FIG. 5). Then, when hammering occurs, since the load applied to the motor 30 decreases intermittently, the rotational speed of the motor 30 changes intermittently.

Above is an example where the effective manipulating range and the controllable range are set with the scale of the trigger pulling amount from 1 to 10. However, the manipulating range and the controllable range may be set appropriately with an entire manipulating range of the trigger 10 (such as from 0 to 10), and such a setting is not limited to the above-described setting method.

The two Tex modes (Tex (thin) and Tex (thick)) are the modes for tightening a Tex screw whose leading end is provided with a drill for drilling a screw-hole on a workpiece. The term Tex is used here as a descriptive term of a common type of screw, and is not used to identify a brand or a trademark.

Figure 8:
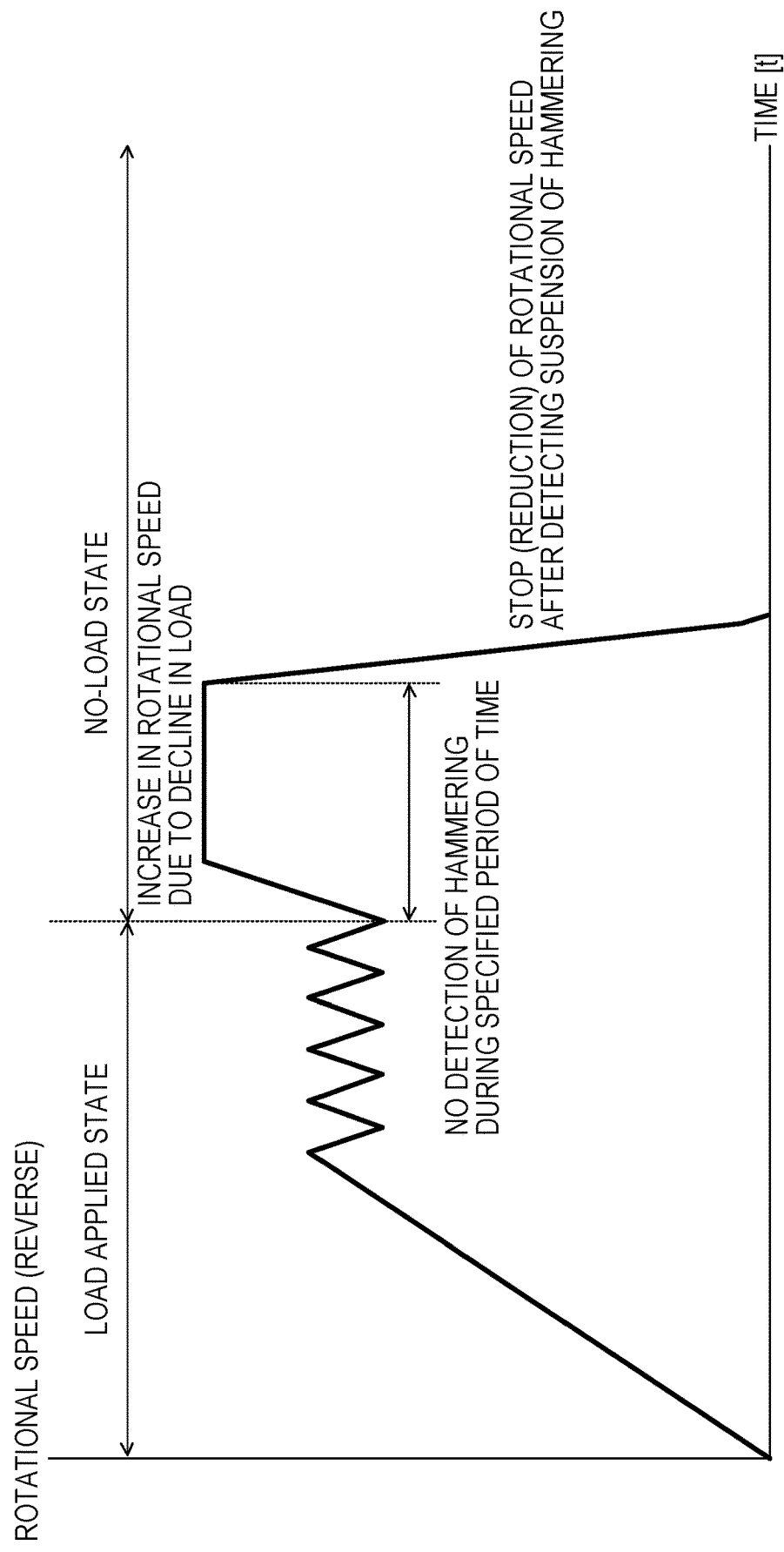
FIG. 8 is a time chart showing change in the rotational speed when the motor is controlled by using the control characteristics of Bolt mode where the motor is rotated reversely.

FIG. 5 shows typical curves for the four hammer modes and for the Bolt mode, wherein the Bolt mode is for tightening a bolt. FIG. 8 illustrates the Bolt mode for loosening a bolt, and is discussed below.

Figure 6:
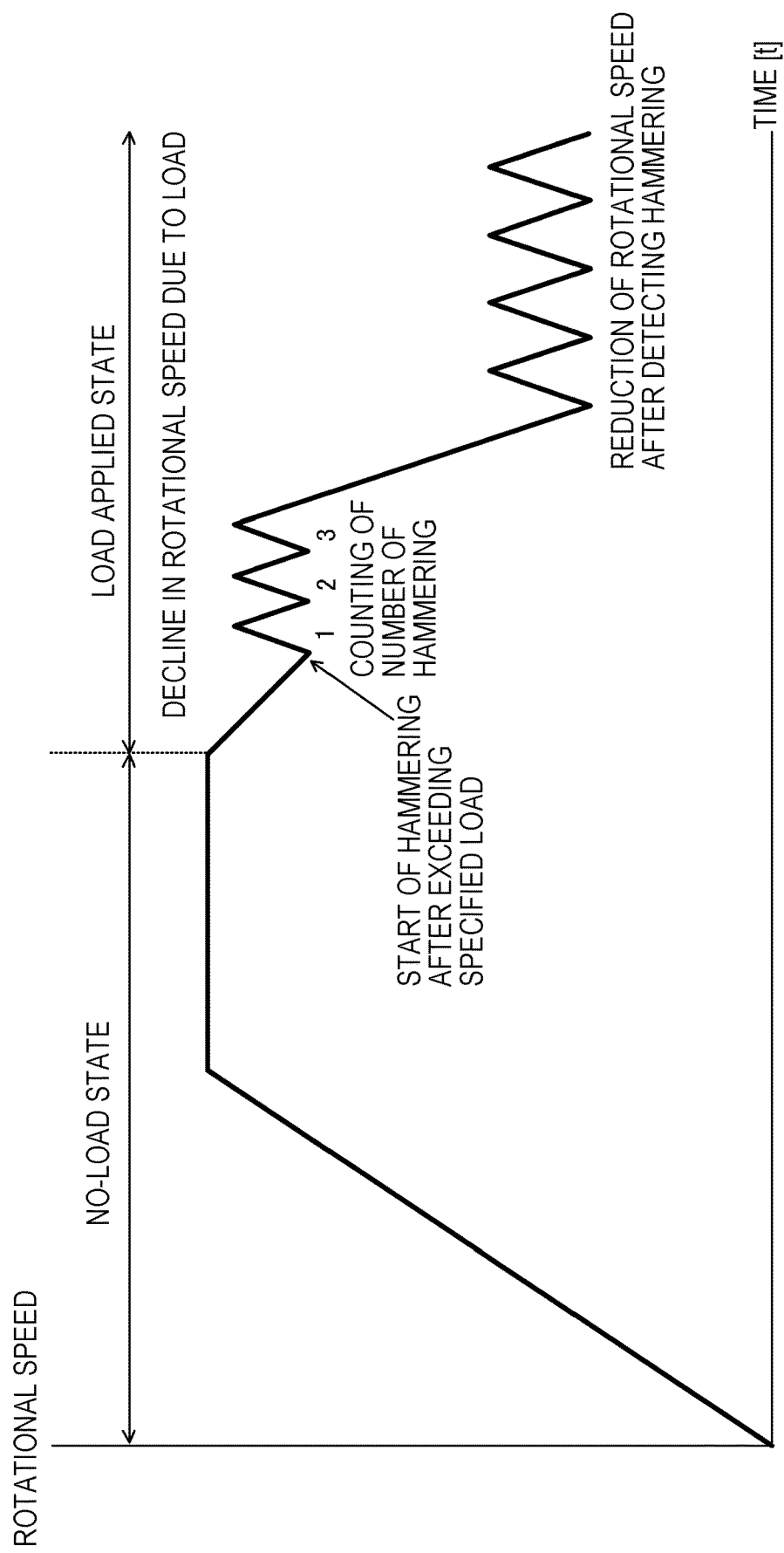
FIG. 6 is a time chart showing change in the rotational speed when the motor is controlled by using the control characteristics of Tex mode.

As shown in FIG. 6, for the Tex (thick) mode, the control characteristics are set to drive the motor according to the PWM signal of a specified duty ratio corresponding to a pulling amount of the trigger 10 in a time period from start of the driving of the motor 30 till occurrence of hammering like in the hammer mode. Then, when the hammering occurred a specified number of times, a determination that a screw-hole is formed on a workpiece is made. For the Tex (thick) mode, the control characteristics are set to reduce the duty ratio of the PWM signal so as to decrease the rotational speed of the motor 30 once the determination that the screw-hole is completed (based on counting a number of the hammering, as shown in FIG. 6) is made.

According to such settings, the motor 30 is rotated at a high speed after the driving of the motor 30 starts until the screw-hole forming on the workpiece is completed and after the completion of the screw-hole forming, the rotational speed of the motor 30 decreases. This enables screw-tightening to be steadily performed.

In this connection, the hammering can be detected by, for example, a change in the rotational speed of the motor 30, a change in the current (an amplitude of the current), vibration applied to the electric power tool, and/or the like. Further, the completion of the screw-hole forming by a Tex screw can be detected by not only a number of the hammering occurrence but also an elapsed time after detecting the hammering occurrence and the like. Further, it may be possible to change a threshold value used for detecting the hammering to, for example, a battery voltage, a motor rotational speed, and the like depending on a condition of the driving of the motor.

Similarly, depending on a thickness of a workpiece, the user can appropriately select either one of the Tex modes: Tex (thin); or Tex (thick).

In the Tex (thin) mode, since a workpiece is thinner compared to a case of the Tex (thick) mode, it takes less time to perform hole-drilling and screw-tightening on a workpiece by a Tex screw. Thus, for the Tex (thin) mode, the control characteristics are set to stop the driving of the motor 30 when the hammering occurred a specified number of times after the start of the driving of the motor. The Tex (thin) mode may also operate based upon a reduced number of hammer counts relative to the Tex (thick) mode.

For the Wood mode (one of the four special modes), the control characteristics are set such that the duty ratio of the PWM signal are set in proportion to the pulling amount of the trigger 10 while being pulled. For the Wood mode, the control characteristics are set such that the duty ratio therein is smaller than that in Maximum of the hammer mode as cases of Low and Medium of the hammer mode.

Figure 7:
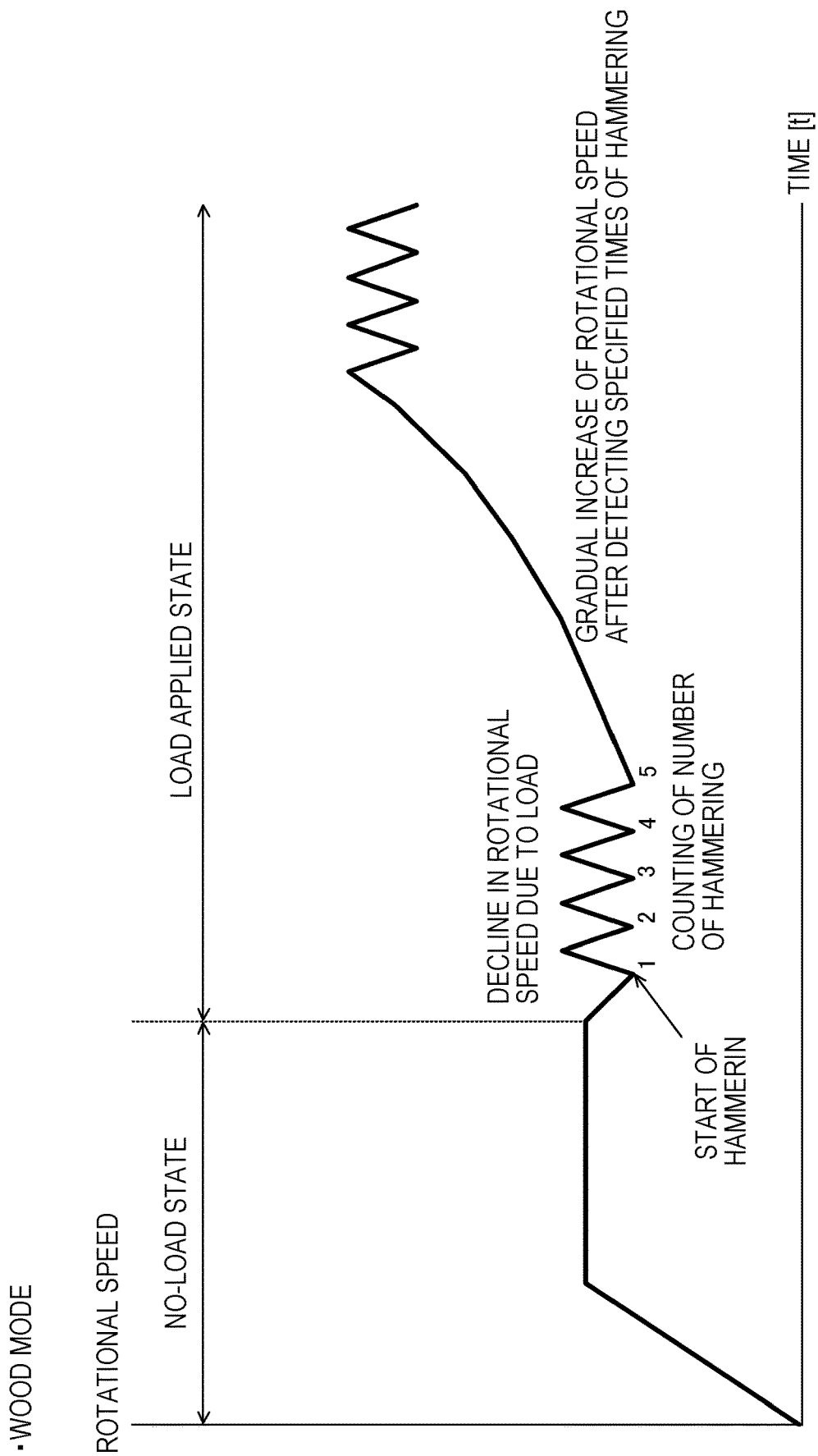
FIG. 7 is a time chart showing change in the rotational speed when the motor is controlled by using the control characteristics of Wood mode.

For the Wood mode, as shown in FIG. 7, the control characteristics are set to gradually increase the duty ratio of the PWM signal after the hammering occurred a specified number of times following the start of the driving of the motor. This is because, in a case of fixing a screw (a wood screw) to a wood, the screw is not yet cut thereinto immediately after the start of the driving of the motor 30 and it is necessary to rotate the screw slowly until the screw is cut into the wood.

Specifically, in the Wood mode, the motor 30 is driven at a low rotational speed after the start of the driving of the motor 30 and then, when the hammering occurred a specified number of times and a determination that the screw is cut into the wood is made, the rotation of the motor 30 increases gradually. According to such settings of the Wood mode, screw-fixing and screw-tightening to the wood can be performed efficiently in a short period of time.

The Bolt mode in FIG. 8 is for tightening or removing a bolt (or a nut).

When tightening or removing the bolt (or the nut) by rotating the motor 30, the tool bit is fit over a head of the bolt (or the nut). By doing so, in the Bolt mode, slipping off of the bolt (or the nut) from the tool bit as usually does not occur. Alternatively, some bolts may have internal openings for attachment, such as hexagonal holes or torx holes.

For this reason, as shown in FIGS. 4A and 4B, the control characteristics for the Bolt mode (for example, in a forward state of the forward/reverse changeover switch 12) are set such that the trigger pulling amount with which the duty ratio of the PWM signal (in other words, the rotational speed of the motor 30) becomes its maximum is smaller as compared to those in the hammer modes. For example, the (forward state) Bolt mode in FIG. 4A reaches 100% PWM duty at a trigger pulling amount of just 4, in comparison to 10 for the four hammer modes. Note, FIG. 8 shows characteristics for the bolt mode during reverse rotation (in a reverse state of the forward/reverse changeover switch 12).

Specifically, for the Bolt mode, the control characteristics of the motor 30 as examples of first control characteristics (specified control characteristics) of the present disclosure are set such that the duty ratio of the PWM signal (in other words, the rotational speed of the motor 30) becomes its maximum when the trigger pulling amount is 4 or more, but less than 10.

Also for the Bolt mode, in order to allow the tightening or the removing the bolt (or the nut) to be performed quickly, the control characteristics are set such that, when the trigger pulling amount is 4 or more, the duty ratio of the PWM signal becomes a value that is the same (or approximately the same) as the maximum value of the duty ratio in Maximum of the hammer modes.

Accordingly, in the Bolt mode, the motor 30 rotates at the maximum speed when the user pulls the trigger 10 by a smaller amount compared to a case of Maximum of the hammer mode, and this enables the tightening or the removing of the bolt (or the nut) in the Bolt mode to be performed efficiently in a short period of time.

Further in the Bolt mode, it is possible for the user to rotate the motor at a high speed without pulling the trigger 10 by almost the maximum pulling amount. Thus, when tightening or removing the bolt (or the nut) in the Bolt mode, it is possible to inhibit the user from abandoning continuation of a work for a long period of time because of finger fatigue due to manipulation of the trigger 10.

In FIG. 8, when loosening the bolt (or the nut) by rotating the motor 30 reversely in the Bolt mode, since a load is applied to the motor 30 from the bolt (or the nut) at start of the driving of the motor 30, hammering occurs almost immediately.

Then, when the bolt (or the nut) is loosened by such hammering, the load applied to the motor 30 declines and the rotational speed of the motor 30 increases.

For the Bolt mode, therefore, as shown in FIG. 8, when the motor 30 rotates reversely, the control characteristics are set to stop (or reduce) the driving of the motor 30 in response to detecting no hammering for a specified period of time after the driving of the motor 30 starts and the hammering is detected.

Accordingly, in the Bolt mode, when loosening the tightening of the bolt (or the nut), falling of the bolt (or the nut) from the tool bit due to unnecessary continuation of the rotation of the motor 30 can be inhibited, or can be assumed/calculated to have already occurred. This specific period of time can be calculated in order to keep the bolt (or nut) slightly engaged, or to fully disengage the bolt, depending upon what is desired. Thus, the Bolt mode may be described as two distinct modes (or sub-modes): a forward-rotation bolt mode; and a reverse-rotation bolt mode. The reverse-rotation bolt mode may be indicated by flashing the bolt mode indictor, or by adding a "reverse" indicator (not shown) as an additional indicator showing the status of the forward/reverse changeover switch 12. Other modes may or may not have distinct reverse modes. Alternatively, the bolt mode may be described as a single mode, with certain characteristics when the driver 1 is in a forward status (due to the forward/reverse changeover switch 12), and different characteristics when the driver 1 is in a reverse status.

The decline in the load applied to the motor 30 in the bolt mode can be sensed also by the rotational speed of the motor 30 or the change in the current. By using such a speed or a change as a parameter instead of using the detection of the hammering, the decline in the load applied to the motor 30 can be sensed. In this manner, the motor 30 of an electric working machine without the hammering mechanism can be driven by using a modified Bolt mode.

<3. Process>

A control process which is performed by the control circuit 80 for controlling the PWM duty and/or the rotational speed of the motor 30 will be described hereinafter by referring to FIGS. 9 and 10. Respective functions of the control circuit 80, which are shown in FIG. 2, are realized when the CPU included in the control circuit 80 performs the control process (a program and/or hard wiring) to be described hereinafter.

When the control circuit 80 is started up and the CPU starts the control process, in a step of S110, the control circuit 80 reads out various settings such as the mode currently set ("current mode" hereinafter). The current mode may be stored in a location of the memory device 92 without disturbing a (stored) registered mode that will be described later. For example, a variable called "registered mode" may be assigned a first location in the memory device 92, and a variable called "current mode" may be assigned a second location that is different from the first location.

In S120, then, based on an input signal from the main switch 10A, the control circuit 80 determines whether the trigger 10 is being pulled or manipulated (at or above a minimum/threshold pulling amount). If the control circuit 80 determines that the trigger 10 is being pulled, then in S130, a motor driving process for driving the motor 30 is performed.

During the motor driving process, in S131, the control circuit 80 obtains the pulling amount (manipulating amount) of the trigger 10 from the manipulating amount sensor 10B. In S132, based on the control characteristics read out in S110, the control circuit 80 performs various calculation processes for controlling the motor 30. The calculation processes may be table lookups.

In S133, based on calculation results of S132, the control circuit 80 decides the duty ratio (a command duty) of the PWM signal that is the control signal for driving the motor 30, as a function of the current mode.

In S134, then, the motor drive control device 94 as part of the control circuit 80 performs a PWM output process. Specifically, according to the PWM signal of the duty ratio decided in S133, the control circuit 80 turns on or off the respective switching devices Q1 to Q6 included in the drive circuit 52, and proceeds to S120.

In S120, on the other hand, if the control circuit 80 determines that the trigger 10 is not operated, then, the control circuit 80 sequentially confirms (identifies or determines) states of the mode-change switch 14, the hammering switch 22, and the special switch 26 in S140, S150, and S160 respectively.

In the confirmation processes of S140, S150, and S160, the control circuit 80 confirms (determines) an ON state or an OFF state of a respective or target switch and further may determine whether the respective switch is long-pushed or short-pushed based on a manipulation (pushing or ON) time of the switch. The switches may alternatively be normally ON switches, which turn OFF when manipulated or pushed.

Figure 11:
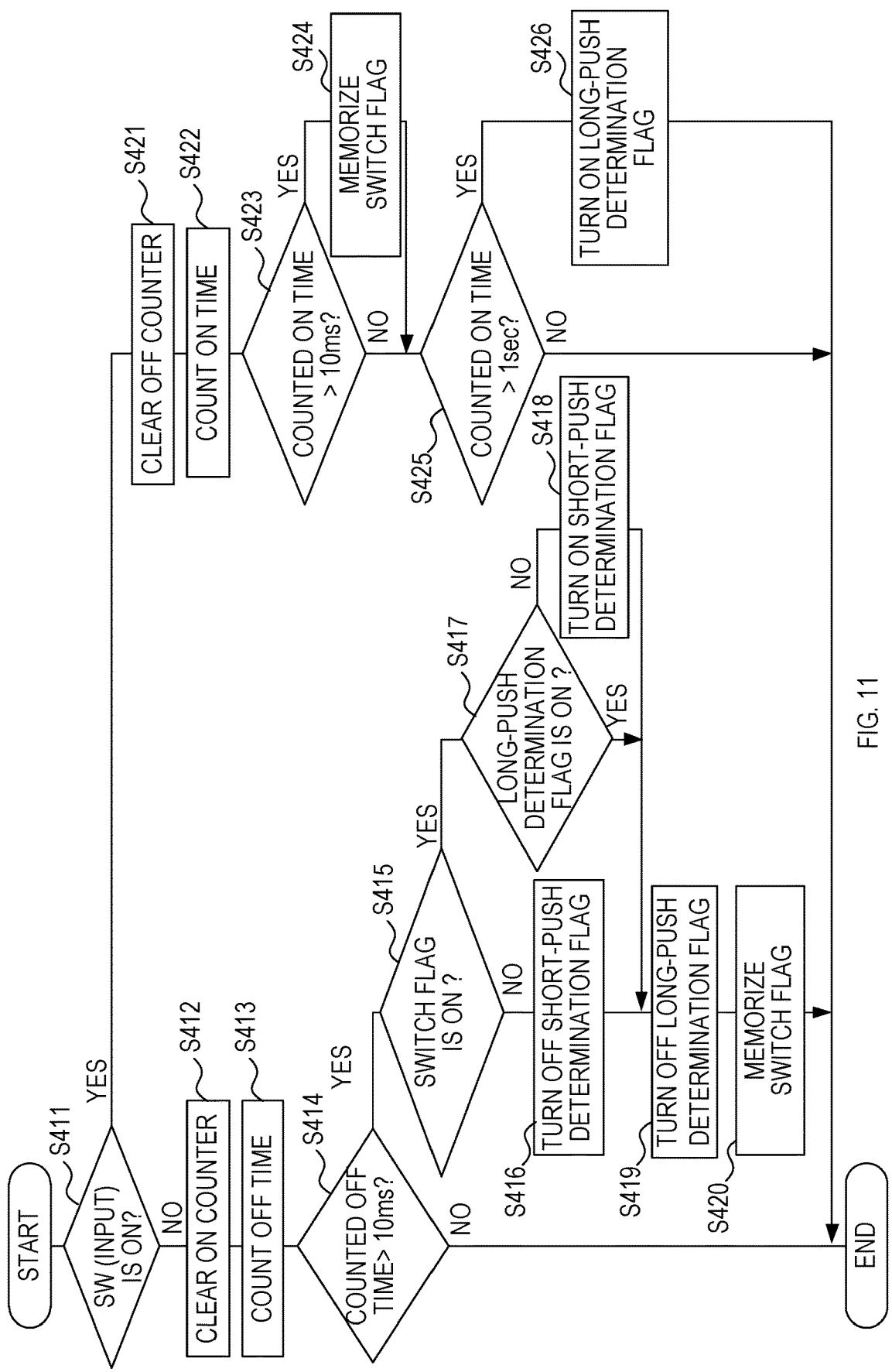
FIG. 11 is a flowchart showing a switch operation confirmation process.

The confirmation processes of S140, S150, and S160 are performed in a procedure shown in FIG. 11. The control circuit 80 includes an ON counter and an OFF counter.

In the confirmation processes of S140, S150, and S160, the control circuit 80 starts determining whether the target switch is in the ON state or the OFF state in S411. If the switch is in the OFF state, then in S412, the control circuit 80 clears the ON counter that counts an ON time.

In S413, the control circuit 80 counts an OFF time by incrementing the OFF counter. In S414, the control circuit 80 determines whether the counted time (OFF time) at the OFF counter exceeds a specified time (a short threshold time, for example, 10 ms).

In S414, if the control circuit 80 determines that the counted time does not exceed the specified time (the short threshold time), then the control circuit 80 ends the confirmation process. In S414, on the other hand, if a determination that the counted time exceeds the specified time (the short threshold time) is made, then, the control circuit 80 proceeds to S415.

In S415, the control circuit 80 determines whether a flag of the switch is ON at present, and if the control circuit 80 determines that such a flag is not ON at present, then in S416, the control circuit 80 turns off a short-push determination flag of the switch. Then in S419, the control circuit 80 turns off a long-push determination flag of the switch. Then in S420, the control circuit 80 determines and memorizes that the flag of the switch is OFF at present and ends the confirmation process. The flag of the switch, the short-push determination flag, and the long-push determination flag are initially OFF.

In S415, on the other hand, if the control circuit 80 determines that the flag of the switch is ON at present, then in S417, the control circuit 80 determines whether the long-push determination flag of the switch is ON. If a determination that the long-push determination flag is ON at present is made, then, the control circuit 80 proceeds to S419. In S417, if the control circuit 80 determines that the long-push determination flag is not ON at present, then in S418, the control circuit 80 turns on the short-push determination flag, and after that, proceeds to S419.

In S411, if the control circuit 80 determines that the switch is in the ON state, then in S421, the control circuit 80 clears the OFF counter that counts the OFF time. Then in S422, the control circuit 80 counts the ON time by incrementing the ON counter.

In S423, then, the control circuit 80 determines whether the counted time (ON time) at the ON counter exceeds a specified time (for example, 10 ms). If a determination that the counted time does not exceed the specified time (the short threshold time) is made, then, the control circuit 80 proceeds to S425. In S423, on the other hand, if a determination that the counted ON time exceeds the specified time is made, then in S424, the control circuit 80 turns on the flag of the switch and memorizes that the flag of the switch is ON at present. After that, the control circuit 80 proceeds to S425.

In S425, the control circuit 80 determines whether the ON time of the switch exceeds a set time (a long threshold time, for example, 1 sec) for the long-push determination. Then if the control circuit 80 determines that the ON time does not exceed the set time for the long-push determination, the control circuit 80 ends the confirmation process. If the control circuit 80 determines that the ON time exceeds the set time for the long-push determination, then, the control circuit 80 determines that the switch is long-pushed. And then in S426, the control circuit 80 turns on the long-push determination flag and ends the confirmation process.

To briefly summarize, in the confirmation process of S140, S150, and S160, when the target switch is operated and changes to the ON state, the ON time is counted and based on such a counted time, whether the switch is long-pushed is determined. Further, when the long push determination flag is not turned on and the switch changes to the OFF state, after a specified time passes with the switch in the OFF state, the short-pushed determination flag is set.

In such a manner, the states of the mode-change switch 14, the hammering switch 22, and the special switch 26 are confirmed in the confirmation process of S140, S150, and S160. Then in S170, the control circuit 80 determines whether the mode-change switch 14 is long-pushed.

Then, if the control circuit 80 determines that the mode-change switch 14 is long-pushed, then in S180, the control circuit 80 determines whether the hammering switch 22 is also long-pushed, and if the hammering switch 22 is also long-pushed, the control circuit 80 proceeds to S190.

In S190, the control circuit 80 memorizes (registers, stores) the mode currently set (that is, the current mode) as the registration mode (or a stored mode) in the memory device 92. The registration mode is the mode that can be changed by the manipulation of the mode-change switch 14. In S190, the (new) current mode (selected by the switches) is stored (set) as the (new) registration mode.

In other words, in the present embodiment, when the mode-change switch 14 and the hammering switch 22 are simultaneously long-pushed, the current mode is registered (stored) in the memory device 92 as the registration mode.

When the current mode is registered as the registration mode in the memory device 92 in such a manner, in S200, the control circuit 80 notifies that the registration mode is set or updated. Specifically, the control circuit 80 allows, for example, the indicator for displaying the current mode (e.g. a Low mode indicator or a Bolt mode indicator) and the setting indicator 46 in the operation panel 20 to flash while the mode-change switch 14 and the hammering switch 22 are being long-pushed.

Figure 10:
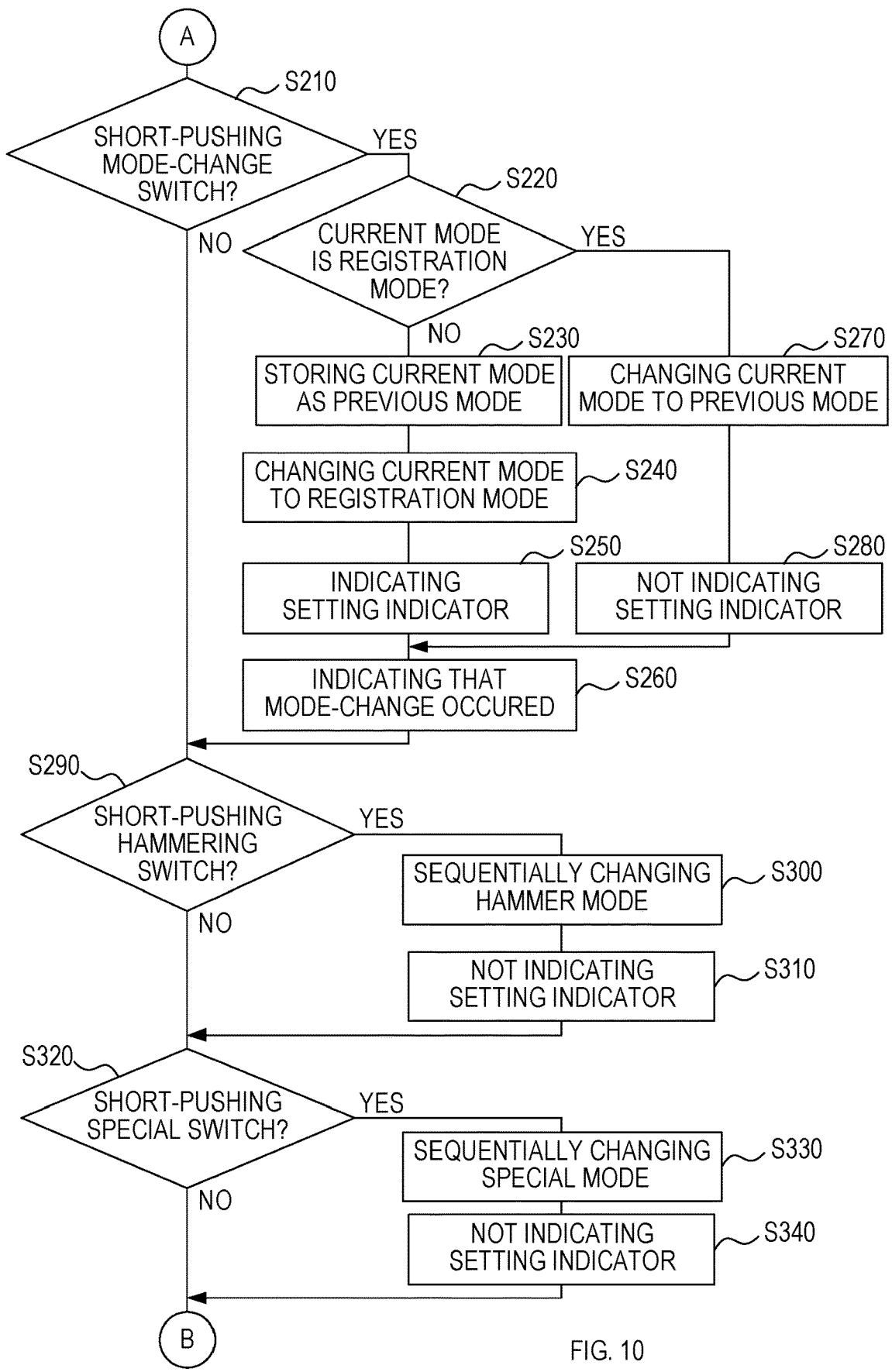
FIG. 10 is a flowchart showing a second half of the motor control process.

Then, when the control circuit 80 ends the notification made in S200, when the control circuit 80 determines that the mode-change switch 14 is not long-pushed in S170, or when the control circuit 80 determines that the hammering switch 22 is not long-pushed in S180, the control circuit 80 proceeds to S210 shown in FIG. 10.

In S210, the control circuit 80 determines whether the mode-change switch 14 is short-pushed. If a determination that the mode-change switch 14 is not short-pushed is made, then, the control circuit 80 proceeds to S290. If a determination that the mode-change switch 14 is short-pushed, then, the control circuit 80 proceeds to S220.

In S220, the control circuit 80 determines whether the current mode (the mode currently set for controlling the motor) is the registration mode. If the control circuit 80 determines that the current mode is not the registration mode, then in S230, the current mode (probably recently set with the hammering switch 22 or the special switch 26) is stored as a previous mode in the memory device 92, and the control circuit 80 proceeds to S240.

In S240, the registration mode is read out and used as the current mode such that the current mode and the registration mode are now the same. Then in S250, by lighting up the setting indicator 46 in the operation panel 20, the control circuit 80 notifies that the current mode is changed to the registration mode, and S260 indicates that a mode change occurred.

In S220, if the control circuit 80 determines that the current mode is the registration mode, then in S270, the control circuit 80 reads out the previous mode stored in the memory device 92, and uses the previous mode as the current mode for controlling the motor. In such a manner, whenever the mode-change switch 14 is short-pushed, the registration mode and the previous mode are set alternately as the current mode for controlling the motor.

Then in S280, by turning off the setting indicator 46, the control circuit 80 notifies that the current mode is not the registration mode changed by the manipulation of the mode-change switch 14, and proceeds to S260.

In S260, by flashing the LEDs of the lights 16 for a certain period of time, the control circuit 80 notifies that the mode is changed by the manipulation of the mode-change switch 14, and proceeds to S290. In other words, S260 indicates that a mode change occurred.

In S290 then, the control circuit 80 determines whether the hammering switch 22 is short-pushed. If the control circuit 80 determines that the hammering switch is not short-pushed, then in S320, the control circuit 80 determines whether the special switch 26 is short-pushed. If a determination that the special switch 26 is not short-pushed is made, then, the control circuit 80 proceeds to S120 shown in FIG. 9, and a series of the aforementioned steps of the processes are performed again.

In S290, if a determination that the hammering switch 22 is short-pushed is made, then, the control circuit 80 proceeds to S300. The four hammer modes are selectable/changeable sequentially by short-pushing the hammering switch 22. In S300, the control circuit 80 sequentially selects the next hammer mode to become the current mode.

Also in S300, the control circuit 80 memorizes the current mode (after the change) in the memory device 92. Further, the corresponding indicator is indicated. For example, the Low mode indicator is indicated.

In S310 then, by turning off the setting indicator 46, the control circuit 80 notifies that the current mode is not necessarily the registration mode.

In S320, if the control circuit 80 determines that the special switch 26 is short-pushed, then in S330, the control circuit 80 advances or cycles to the next special mode. The four special modes (Wood, Bolt, Tex (thin), and Tex (thick)) are selectable/changeable sequentially by short-pushing the special switch 26. In S330, the control circuit 80 sequentially selects the next special mode to become the current mode, and proceeds to S340.

Also in S330, like in S300, the control circuit 80 memorizes the current mode after the change in the memory device 92, and notifies the current mode in use by indicating the corresponding indicator. For example, the Bolt mode indicator is indicated.

Figure 9:
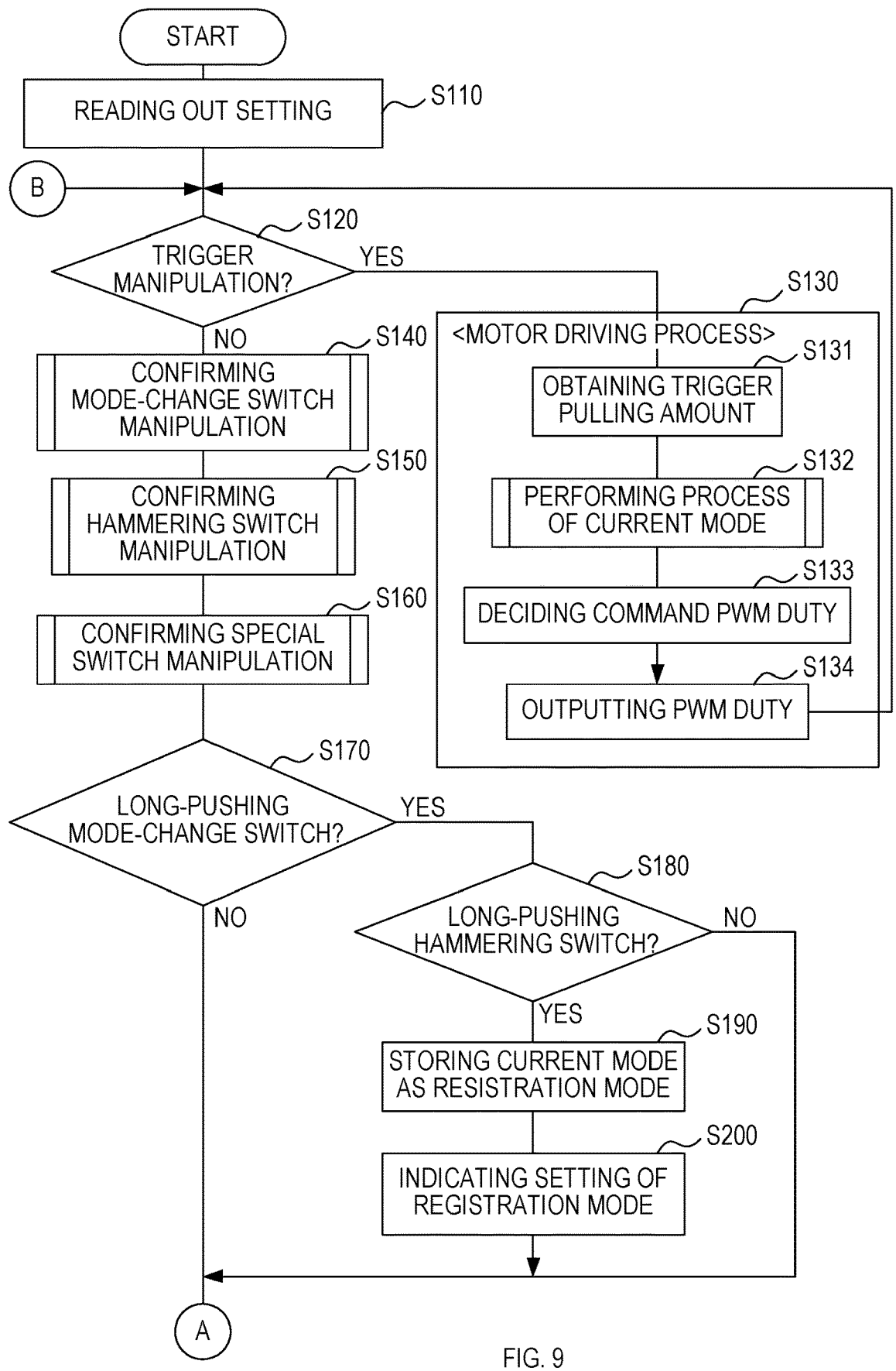
FIG. 9 is a flowchart showing a first half of a motor control process.

In S340 then, by turning off the setting indicator 46, the control circuit 80 notifies that the current mode is not necessarily the registration mode, and proceeds to S120 of FIG. 9.

As described so far, in the driver 1 of the present embodiment, the eight types of the modes (the control characteristics), which specify the control methods of the motor 30, are memorized in the memory device 92.

And the user can select the mode out of the eight types of the modes by operating the hammering switch 22, the special switch 26, or the mode-change switch 14.

In this connection, the selected mode is memorized in the memory device 92 in the aforementioned S190, S240, S270, S300, or S330. Then, the mode memorized in the memory device 92 is read out in S110 and utilized for selecting the control characteristics used for controlling the motor 30 in the motor driving process of S130.

By operating the hammering switch 22 or the special switch 26, the user can change the mode to be set sequentially out of the four types, which corresponds to the respective switches, of the mode (the hammer mode or the special mode).

In contrast, with the mode-change switch 14, the mode that is settable therewith can be preliminarily registered. Further, each time the user operates the mode-change switch 14, it is possible for the user to change the mode for controlling the motor between the registration mode and the mode set with the hammering switch 22 or the special switch 26 alternately.

Accordingly, the user is allowed to change the mode very easily by preliminarily registering a desired mode as the registration mode, which can improve usability of the driver 1.

Among the aforementioned eight types of the modes, in the Bolt mode, while the motor 30 is allowed to be driven at the maximum rotational speed like in the Maximum mode, the pulling amount of the trigger 10 required to achieve the maximum rotational speed is set to be smaller than that in the Maximum mode.

Specifically, the control characteristics for the Bolt mode are set such that the duty ratio of the PWM signal becomes its maximum by the pulling amount of the trigger 10 with its pulling range set to 50% or less (approximately 40% in the present embodiment) of the effective manipulating range where the motor 30 is drivable. Thus, with such a pulling amount, the rotational speed of the motor 30 also becomes the maximum rotational speed.

As a result, when tightening or removing a bolt (or a nut), it is not necessary for the user to fully pull the trigger 10, which can improve operability of the driver 1.

[Modified Example]

In the aforementioned embodiment, by long-pushing the mode-change switch 14 and the hammering switch 22, the current mode can be registered as the registration mode.

Thus, by selecting the mode different from the current registration mode as the mode for controlling the motor and then, long-pushing the mode-change switch 14 and the hammering switch 22, the registration mode can be changed (replaced or overwritten).

In contrast, it may be possible to enable additional registration of another mode as the registration mode in addition to the existing registration mode by long-pushing the mode-change switch 14 and the hammering switch 22.

Further, it may be possible to enable clearing (deletion) of registration of the registration mode. In such a case, for example, it may also be possible to enable clearing (deletion) of registration of all the registration modes and then, to allow the preset mode to be initially registered as the registration mode.

Also, it may be possible to enable, through initially setting or the like, the mode-change switch 14 to have a changing function, which is through short-pushing, similar to both of the hammering switch 22 and the special switch 26 as the first setters or similar to either one thereof, in addition to a registering changing function. The registering changing function is a function of changing the registration modes as the current mode.

Since the mode-change switch 14 is disposed below the chuck sleeve 8 where the tool bit is mounted, the mode-change switch 14 may hit an object in a surrounding area during a work and be caused to be turned on accidentally. Accordingly, if required, it may be possible to allow an operation of the mode-change switch 14 to be invalidated (or "locked out").

In the modified example, the control circuit 80 realizes respective functions of the above-described modified example by performing a motor control process according to the modified example.

In the following description of the modified example, the hammering switch 22 and the special switch 26, which serve as the first setters, among the three switches provided in the operation panel 20 shown in FIG. 2, are referred to as a SW1 and a SW3 respectively while the light switch 24 is referred to as a SW2.

The motor control process that the control circuit 80 performs in the modified example will be explained below by referring to flowcharts of FIG. 12 to FIG. 14. The flowcharts shown in FIG. 12 to FIG. 14 describe procedures of the process focusing in "actions of the control circuit 80 taken in response to an operation of the mode-change switch 14", which are different from those of the aforementioned embodiment. In the flowcharts shown in FIG. 12 to FIG. 14, thus, the description on the actions for changing the control characteristics, which are taken according to the short-pushing of the hammering switch 22 or the special switch 26 are omitted.

That is, when the hammering switch 22 or the special switch 26 is short-pushed, the steps from S290 to S340 as shown in FIG. 10 are performed and the hammer modes or the special modes are sequentially changed also in the modified example.

Figure 12:
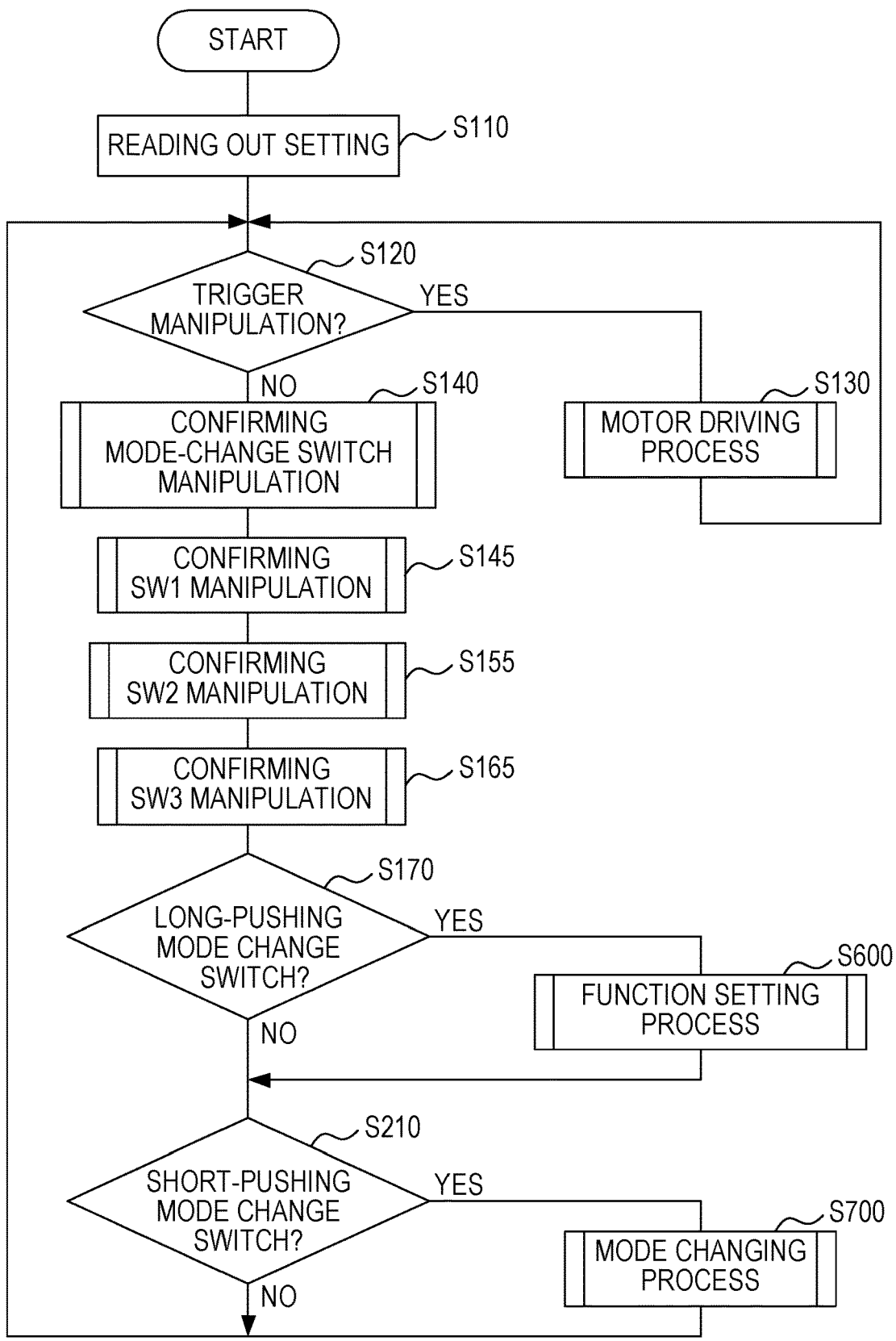
FIG. 12 is a flowchart showing the motor control process of a modified example.
Figure 13:
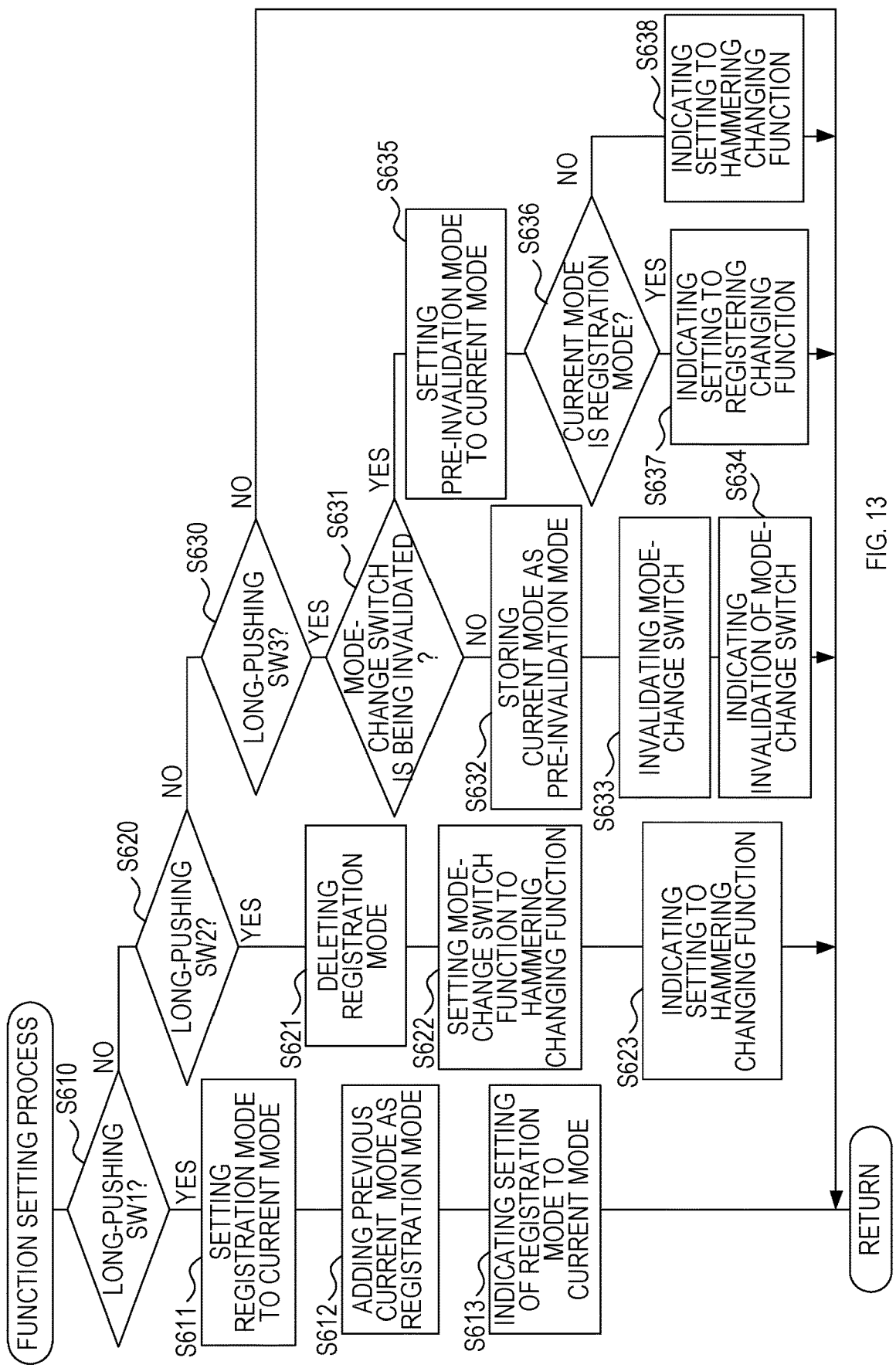
FIG. 13 is a flowchart showing a function setting process.

As shown in FIG. 12, in a motor control process of the modified example like the motor control process of the aforementioned embodiment, the control circuit 80 reads out from the memory device 92 respective settings such as the currently set mode, the control characteristics thereof, and the like in S110.

In S120, then, the control circuit 80 determines whether the trigger 10 is being pulled based on the input signal of the main switch 10A. If the control circuit 80 determines that the trigger 10 is being pulled, then in S130, the driving process for driving the motor 30 is performed.

In S120, on the other hand, if the control circuit 80 determines that the trigger 10 is not manipulated, then, the control circuit 80 sequentially confirms the operation states of the mode-change switch 14, the SW1, the SW2, and the SW3 in S140, S145, S155, and S165 respectively. Similar to the confirmation process of the aforementioned embodiment, in the modified example, the control circuit 80 performs the confirmation process of S140, S145, S155, and S165 in the procedure shown in FIG. 11.

As a result, in the confirmation process of S140, S145, S155, and S165, whether the mode-change switch 14, the SW1, the SW2 and the SW3 are operated and, if they are operated, whether such an operation is long-pushing or short-pushing are determined.

In S170, then, similar to the aforementioned embodiment, the control circuit 80 determines whether the mode-change switch 14 is long-pushed. If the control circuit 80 determines that the mode-change switch 14 is long-pushed, then in S600, a function setting process shown in FIG. 13 is performed.

If determination that the mode-change switch 14 is not long-pushed is made in S170 or if the function setting process of S600 is completed, then, the control circuit 80 proceeds to S210. Similar to the aforementioned embodiment, in S210, the control circuit 80 determines whether the mode-change switch 14 is short-pushed.

Figure 14:
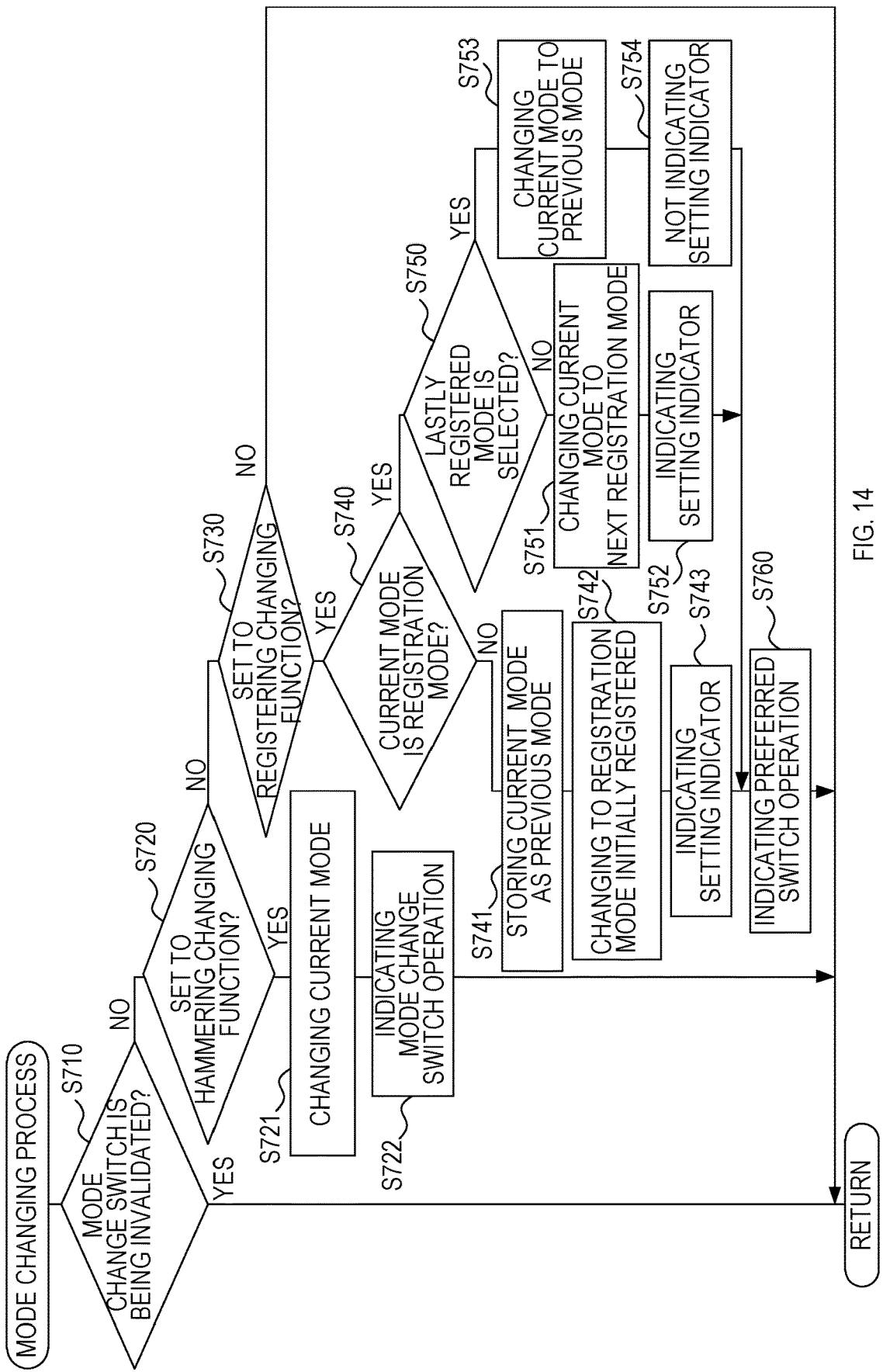
FIG. 14 is a flowchart of a mode changing process.

In S210, if determination that the mode-change switch 14 is short-pushed is made, then, the control circuit 80 proceeds to S700 and after performing a mode changing process shown in FIG. 14, the control circuit 80 proceeds to S120. In S210, if determination that the mode-change switch 14 is not short-pushed is made, then, no action is taken and the control circuit 80 proceeds to S120.

Next, the function setting process that the control circuit 80 performs in S600 will be explained by referring to the flowchart of FIG. 13.

In S610, the control circuit 80 determines whether the SW1 (hammering switch) is long-pushed and if the SW1 is long-pushed, then, the control circuit 80 proceeds to S611.

In S611, the control circuit 80 sets the registration mode to be used as the current mode and in S612, adds the previous current mode as one of the registration mode.

In this modified example, through the step above, it becomes possible to additionally register the mode (a plurality of the modes) as the registration mode.

Then, in S613, the control circuit 80 notifies that the registration mode is set as the current mode by lighting up or flashing a specified LED provided in the operation panel 20, and ends the function setting process.

In S610, if determination that the SW1 is not long-pushed is made, then, the control circuit 80 proceeds to S620 and determines whether the SW2 (light switch) is long-pushed. If determination that the SW2 is long-pushed is made, then, in S621, the control circuit 80 deletes the registration mode(s) and proceeds to S622.

In S622, in order to enable the mode-change switch 14 to function like the hammering switch 22 (that is, the SW1), the control circuit 80 sets a function of the mode-change switch 14 to be a hammering changing function.

In S623, then, the control circuit 80 notifies that the function of the mode-change switch 14 is set to the hammering changing function by lighting up or flashing a specified LED provided in the operation panel 20, and ends the function setting process.

In a case where the function of the mode-change switch 14 is set to the hammering changing function in such a manner, it becomes possible to change the control characteristics used for controlling the motor to either one of the hammer modes, Maximum, High, Medium, or Low, sequentially whenever the mode-change switch 14 is operated.

Further, if the steps of S611 and later are performed with the function of the mode-change switch 14 set to the hammering changing function, then, such setting of the mode-change switch 14 to the hammering changing function is released (cleared). Then, the function of the mode-change switch 14 has returned to a registering changing function.

In S620, if determination that the SW2 is not long-pushed is made, then, the control circuit 80 proceeds to S630 and determines whether the SW3 (special switch) is long-pushed.

If determination that the SW3 is not long-pushed is made, then, the control circuit 80 ends the function setting process. On the other hand, if determination that the SW3 is long-pushed is made, then, the control circuit 80 proceeds to S631 and determines whether the function of the mode-change switch 14 is currently invalidated.

In S631, if determination that the function of the mode-change switch 14 is not invalidated is made, then, the control circuit 80 proceeds to S632 and memorizes the current mode (control characteristics) as a pre-invalidation mode in the memory device 92.

In S633, then, the control circuit 80 invalidates the function of the mode-change switch and proceeds to S634. In this regard, the invalidation of the function of the mode-change switch 14 prohibits the mode (control characteristics) from being changed by short-pushing the mode-change switch.

In S634, the control circuit 80 notifies that the mode-change switch 14 is invalidated by lighting up or flashing a specified LED provided in the operation panel 20, and ends the function setting process.

In S631, if determination that the function of the mode-change switch 14 is being invalidated is made, then, the control circuit 80 proceeds to S635. In S635, the control circuit 80 cancels invalidation of the mode-change switch 14, and sets the mode (control characteristics) for controlling the motor to the pre-invalidation mode memorized in the memory device 92 in S632.

In S636, then, the control circuit 80 determines whether the pre-invalidation mode is the registration mode. In S636, if determination that the pre-invalidation mode is the registration mode is made, then, the control circuit 80 proceeds to S637. In S637, the control circuit 80 notifies that the function of the mode-change switch 14 has been set to the registering changing function by lighting up or flashing a specified LED provided in the operation panel 20, and ends the function setting process.

In S636, if determination that the pre-invalidation mode is not the registration mode is made, then, the control circuit 80 proceeds to S638. In S638, the control circuit 80 notifies that the function of the mode-change switch 14 is set to the hammering changing function by lighting up or flashing a specified LED provided in the operation panel 20, like in S623, and ends the function setting process.

Next, the mode changing process that the control circuit 80 performs in S700 will be explained by referring to the flowchart of FIG. 14.

In S710, the control circuit 80 determines whether the function of the mode-change switch 14 is being invalidated. If determination that the function of the mode-change switch 14 is being invalidated is made, since the short-pushing of the mode-change switch 14 has already been invalidated, the control circuit 80 ends the mode changing process.

In S710, if determination that the mode-change switch 14 is not invalidated is made, then, the control circuit 80 proceeds S720. The control circuit 80, in S720, determines whether the function of the mode-change switch 14 is set to the hammering changing function.

If determination that the function of the mode-change switch 14 is set to the hammering changing function is made, then, the control circuit 80 proceeds to S721. The control circuit 80, in S721, changes the current mode to either one of the four hammer modes, Maximum, High, Medium, or Low, like a case where the hammering switch 22 (SW1) is operated.

In S722, then, the control circuit 80 notifies that the current mode is changed by an operation of the mode-change switch 14 by lighting up or flashing the LED of the light 16, and ends the mode changing process.

In S720, if determination that the function of the mode-change switch 14 is not set to the hammering changing function is made, then, the control circuit 80 proceeds S730. The control circuit 80, in S730, determines whether the function of the mode-change switch 14 is set to the registering changing function. If determination that the function of the mode-change switch 14 is not set to the registering changing function is made, then, the control circuit 80 ends the mode changing process. If determination that the function of the mode-change switch 14 is set to the registering changing function is made, then, the control circuit 80 proceeds to S740.

In S740, the control circuit 80 determines whether the current mode (control characteristics) is either one of the registration mode.

If determination that the current mode is not either one of the registration modes is made, then in S741, the current mode is memorized as the previous mode in the memory device 92 and the control circuit 80 proceeds to S742.

In S742, the control circuit 80 reads out the initially registered registration mode out of the modes registered in the memory device 92 and the read registration mode is set as the current mode.

In S743, then, the control circuit 80 notifies that the current mode is the registration mode by lighting up the LED of the setting indicator 46 and, proceeds to S760.

In S760, the control circuit 80 notifies that the mode is changed by an operation of the mode-change switch 14 by flashing the LED of the light 16 for a certain period of time, and ends the mode changing process.

In S740, if determination that the current mode is either one of the registration modes is made, then, the control circuit 80 proceeds to S750. The control circuit 80, in S750, determines whether the current mode is the lastly registered registration mode out of the registration modes.

If determination that the current mode is not the lastly registered registration mode is made, then, the control circuit 80 proceeds to S751. The control circuit 80, in S751, select the registration mode that is registered next to the currently set registration mode out of the registration modes, and sets the selected mode as the current mode. This enables, in a case where the plurality of the registration modes are registered, setting of the mode out of the registration modes in their registration order as the current mode. In S752, then, the control circuit 80 notifies that the current mode is the registration mode by lighting up the LED of the setting indicator 46 and, proceeds to S760.

In S750, if determination that the current mode is the registration mode lastly registered is made, then, the control circuit 80 proceeds to S753. The control circuit 80, in S753, sets the mode memorized as the previous mode in S741 as the current mode since all the registration modes have already been selected sequentially by the mode changing process and, proceeds to S754.

Then, in S754, the control circuit 80 notifies that the current mode is not the registration mode by turning off the LED of the setting indicator 46 and, proceeds to S700.

As described so far, through the motor control process of this modified example, which the control circuit 80 performs, similar to the aforementioned embodiment, the registration mode that is settable with the mode-change switch 14 can be registered by long-pushing the mode-change switch 14 and the SW1 (hammering switch) simultaneously. Moreover, at such registration, the mode different from the existing registration mode can be additionally registered.

Further, after registering the plurality of the registration modes, when the mode-change switch 14 is short-pushed, the registration mode can be set sequentially as the current mode.

Moreover, after all the registration modes are set sequentially by short-pushing the mode-change switch 14, the previous mode can be set by the following short-pushing. The previous mode is the mode set by an operation of the hammering switch 22 or the special switch 26.

Accordingly, in this modified example, when the user registers the plurality of the registration modes, a number of the modes changeable by an operation of the mode-change switch 14 can be increased arbitrarily, which can improve usability.

Further, it is possible to allow the mode-change switch 14 to function like the hammering switch 22 by setting the function of the mode-change switch 14 to the hammering changing function. This allows the user to change hammering power even while gripping the grip 4 (that is, during a work).

In this connection, although it has been explained that the mode-change switch 14 is allowed to function like the hammering switch 22 in this modified example, it may be possible to allow the mode-change switch 14 to function as the special switch 26. Also, it may be possible to allow the mode-change switch 14 to function as both the hammering switch 22 and the special switch 26, or as other operable portion such as the forward/reverse changeover switch 12 or the like.

Moreover, in this modified example, it may also be possible to invalidate the mode-change switch 14 so as to make the operation thereof inacceptable when short-pushing thereof is performed. As a result, such invalidation of the mode-change switch 14 can inhibit the mode from being wrongly changed in an environment where the mode-change switch 14 is likely to be wrongly operated.

Although the embodiment and the modified example of the present disclosure have been described above, the present disclosure is not limited to the above-described embodiment and the modified example, but may be practiced in various forms.

In the aforementioned embodiment and the modified example, when the mode-change switch 14 as, the second setter and the hammering switch 42 as the first setter are simultaneously long-pushed, the current mode is registered. However, the present disclosure is not limited to such a setting method. It may be possible, for example, to allow the current mode to be registered as the registration mode by an operation of the mode-change switch 14 only.

Further, it may be possible to enable a desired mode that the user selected, instead of the current mode, to be the mode registerable as the registration mode.

For example, it may be possible that the control circuit 80 performs a registering process of the mode by an operation of one or more operable portions provided in the electric working machine. In such a registering process, it may be possible that the mode registerable as the registration mode can be changed by an operation of the mode-change switch 14 and when a switch operation for establishing the setting is lastly performed, the then selected mode can be registered as the registration mode.

In the aforementioned embodiment, the driver 1 has been described as one example of the electric working machine of the present disclosure. However, as far as the electric working machine of the present disclosure is configured to include a motor as a driving source and to control a rotational speed of such a motor in proportion to a manipulating amount of a manipulator such as a trigger or the like, similar to the aforementioned embodiment, such an electric working machine is applicable and the same effects can be brought about.

Also in the aforementioned embodiment, it has been described that the motor 30 is configured with the three-phase brushless motor. However, technologies of the present disclosure are applicable even when a driving source of the electric working machine is a motor with a brush or an alternate motor A plurality of functions performed by one element in the above-described embodiments may be performed by a plurality of elements, and one function performed by one element may be performed by a plurality of elements. A plurality of functions performed by a plurality of elements may be performed by one element, and one function performed by a plurality of elements may be performed by one element. Part of the configuration in the aforementioned embodiments may be omitted. At least part of the configuration in the aforementioned embodiments may be added to or replaced by the configuration in the aforementioned other embodiments. Any modes within the scope of the technical ideas identified from the claim language are embodiments of the present disclosure.

What is claimed is:

1. An electric working machine comprising:
   a motor;
   a memory in which motor control methods for controlling operation of the motor are registered;
   a controller configured to control the operation of the motor in accordance with the motor control methods;
   a body housing that houses the motor, the memory and the controller;
   a first setter movably supported by the body housing and configured to be operated between at least two first setter positions, each position of the at least two first setter positions corresponding to a specific one of the motor control methods;
   a second setter movably supported by the body housing and configured to be operated between at least two second setter positions; and
   a manipulator configured to be manipulated for allowing a function of the electric working machine to work, wherein:
   the electric working machine is configured such that a predetermined operation of two or more of the first setter, the second setter and the manipulator results in an output of a registration signal to the controller; and
   the controller is configured to:
   each time the first setter is operated to one of the at least two first setter positions, select and set one of the motor control methods in the memory as a first control method;
   in response to the second setter being operated, switch the control method for operating the motor in a first rotational direction between only the first control method and an at least one second control method of the motor control methods, the at least one second control method being different from the first control method; and
   in response to receipt of the registration signal, register the first control method in the memory as the at least one second control method.

2. The electric working machine according to claim 1, wherein the at least one second control method includes second control methods that are selected from the motor control methods, and
   wherein the controller is configured to register the second control methods in the memory.

3. The electric working machine according to claim 1, further comprising
   a first notifier configured to notify information regarding the electric working machine,
   wherein the controller is configured to, in response to the motor being controlled based on the at least one second control method, notify that the motor is controlled based on the at least one second control method via the first notifier.

4. The electric working machine according to claim 1, wherein the controller is configured to select and set the at least one second control method from all the motor control methods.

5. The electric working machine according to claim 4, wherein the first setter includes third setters configured to be operated to set the motor control methods which are different from each other as the first control method, and
   wherein the controller is configured to select and set the at least one second control method in the memory from all the motor control methods, all the motor control methods being set by one of the third setters.

6. The electric working machine according to claim 1, further comprising
   a grip configured to be gripped by a hand of a user when the user is using the electric working machine,
   wherein the second setter is provided at a position so as to be operable by the hand of the user when the hand is gripping the grip.

7. The electric working machine according to claim 6,
wherein, in the grip, a driving manipulator is provided, the driving manipulator being configured to be manipulated for commanding driving or stopping of the motor, and
wherein the second setter is provided on an upper side of the driving manipulator in a state where the user grips the grip.

8. An electric working machine comprising:
a motor;
a memory in which motor control methods for controlling operation of the motor are registered;
a controller configured to control the operation of the motor in accordance with the motor control methods;
a body housing that houses the motor, the memory and the controller;
a first setter movably supported by the body housing and configured to be operated between at least two first setter positions;
a second setter movably supported by the body housing and configured to be operated between at least two second setter positions; and
a manipulator configured to be manipulated for allowing a function of the electric working machine to work, wherein:
the electric working machine is configured such that a predetermined operation of two or more of the first setter, the second setter and the manipulator results in an output of a registration signal to the controller; and
the controller is configured to:
each time the first setter is operated to one of the at least two first setter positions, select and set one of the motor control methods as a first control method;
in response to the second setter being operated, switch the control method for operating the motor in a first rotational direction between only the first control method and a second control method of the motor control methods, the second control method being different than the first control method; and
in response to receipt of the registration signal, register the first control method in the memory as the second control method.

9. An electric working machine comprising:
a motor;
a load detector configured to detect a load applied to the motor;
a trigger configured to be manipulated for commanding driving or stopping of the motor;
a memory in which hammering modes and other modes of operation of the electric working machine are registered, the hammering modes including a trigger control method for changing a rotational speed of the motor according to a manipulating amount of the trigger, the other modes including a load control method for changing the rotational speed in response to detection of the load by the load detector;
a controller configured to control operation of the motor;
a body housing that houses the motor, the memory and the controller;
a first setter moving supported by the body housing and configured to be operated between at least two first setter positions;
a second setter movably supported by the body housing and configured to be operated between at least two second setter positions; and
a manipulator configured to be manipulated for allowing a function of the electric working machine to work, wherein:
the electric working machine is configured such that a predetermined operation of two or more of the first setter, the second setter and the manipulator results in an output of a registration signal to the controller; and
the controller is configured to:
each time the first setter is operated to one of the at least two first setter positions, select and set one of the hammering modes or the other modes as a first control method,
in response to the second setter being operated, switch the control method for operating the motor in a first rotational direction between only the first control method and an at least one second control method of the motor control methods, the at least one second control method being different than the first control method; and
in response to receipt of the registration signal, register the first control method in the memory as the at least one second control method; and
the load is from the operation of the electric working machine in one of the other modes.

* * * * *